(12) United States Patent
Kawanishi et al.

(10) Patent No.: US 8,675,096 B2
(45) Date of Patent: Mar. 18, 2014

(54) IMAGE CAPTURING DEVICE FOR SETTING ONE OR MORE SETTING VALUES FOR AN IMAGING MECHANISM BASED ON ACQUIRED SOUND DATA THAT INCLUDES INFORMATION REFLECTING AN IMAGING ENVIRONMENT

(75) Inventors: Ryouichi Kawanishi, Kyoto (JP);
Tsutomu Uenoyama, Osaka (JP);
Yasutoshi Yamamoto, Osaka (JP);
Keiichi Miyazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 392 days.

(21) Appl. No.: 12/994,242

(22) PCT Filed: Mar. 29, 2010

(86) PCT No.: PCT/JP2010/002270
§ 371 (c)(1),
(2), (4) Date: Nov. 23, 2010

(87) PCT Pub. No.: WO2010/113463
PCT Pub. Date: Oct. 7, 2010

(65) Prior Publication Data
US 2011/0069201 A1 Mar. 24, 2011

(30) Foreign Application Priority Data
Mar. 31, 2009 (JP) ................................. 2009-084544

(51) Int. Cl.
*H04N 5/76* (2006.01)
(52) U.S. Cl.
USPC ....................................................... 348/231.4

(58) Field of Classification Search
USPC ....................................................... 348/231.4
See application file for complete search history.

(56) References Cited

U.S. PATENT DOCUMENTS

| 7,145,597 | B1 | 12/2006 | Kinjo | |
| 7,717,629 | B2 * | 5/2010 | Kenoyer et al. | 396/428 |
| 8,169,484 | B2 * | 5/2012 | Silberstein | 348/207.99 |
| 2003/0215010 | A1 * | 11/2003 | Kashiwa | 375/240.02 |
| 2004/0208114 | A1 | 10/2004 | Lao et al. | |
| 2005/0237411 | A1 * | 10/2005 | Watanabe | 348/333.02 |
| 2006/0159445 | A1 * | 7/2006 | Ono et al. | 396/312 |

(Continued)

FOREIGN PATENT DOCUMENTS

| CN | 1522052 | 8/2004 |
| CN | 1832572 | 9/2006 |

(Continued)

OTHER PUBLICATIONS

International Search Report issued in International (PCT) Application No. PCT/JP2010/002270.

(Continued)

*Primary Examiner* — Roberto Velez
*Assistant Examiner* — Fayez Bhuiyan
(74) *Attorney, Agent, or Firm* — Wenderoth, Lind & Ponack, L.L.P.

(57) ABSTRACT

An imaging device of the present invention comprises: an imaging mechanism; a sound acquisition unit operable to acquire sound data that includes information reflecting an imaging environment; and a setting unit operable to, based on the sound data acquired by the sound acquisition unit, select and set one or more setting values for controlling the imaging mechanism.

12 Claims, 21 Drawing Sheets

(56) References Cited

U.S. PATENT DOCUMENTS

| | | |
|---|---|---|
| 2007/0153111 A1 | 7/2007 | Kato |
| 2009/0010455 A1* | 1/2009 | Suzuki et al. .................. 381/97 |
| 2009/0295948 A1* | 12/2009 | Oishi ............................ 348/239 |
| 2010/0079589 A1* | 4/2010 | Yoshida et al. ................ 348/81 |
| 2010/0094633 A1 | 4/2010 | Kawamura et al. |

FOREIGN PATENT DOCUMENTS

| | | |
|---|---|---|
| CN | 101287073 | 10/2008 |
| EP | 2 136 358 | 12/2009 |
| JP | 2001-238177 | 8/2001 |
| JP | 2003-274360 | 9/2003 |
| JP | 2005-341029 | 12/2005 |
| JP | 2006-86758 | 3/2006 |
| JP | 2007-184733 | 7/2007 |
| JP | 2007-295034 | 11/2007 |
| JP | 2008-11289 | 1/2008 |
| JP | 2008-141635 | 6/2008 |
| JP | 2008-205941 | 9/2008 |
| JP | 2010-98642 | 4/2010 |
| WO | 2008/126347 | 10/2008 |
| WO | 2009/050880 | 4/2009 |

OTHER PUBLICATIONS

MPEG7 Audio and Beyond, John Willey & Sons Ltd., 2005.

* cited by examiner

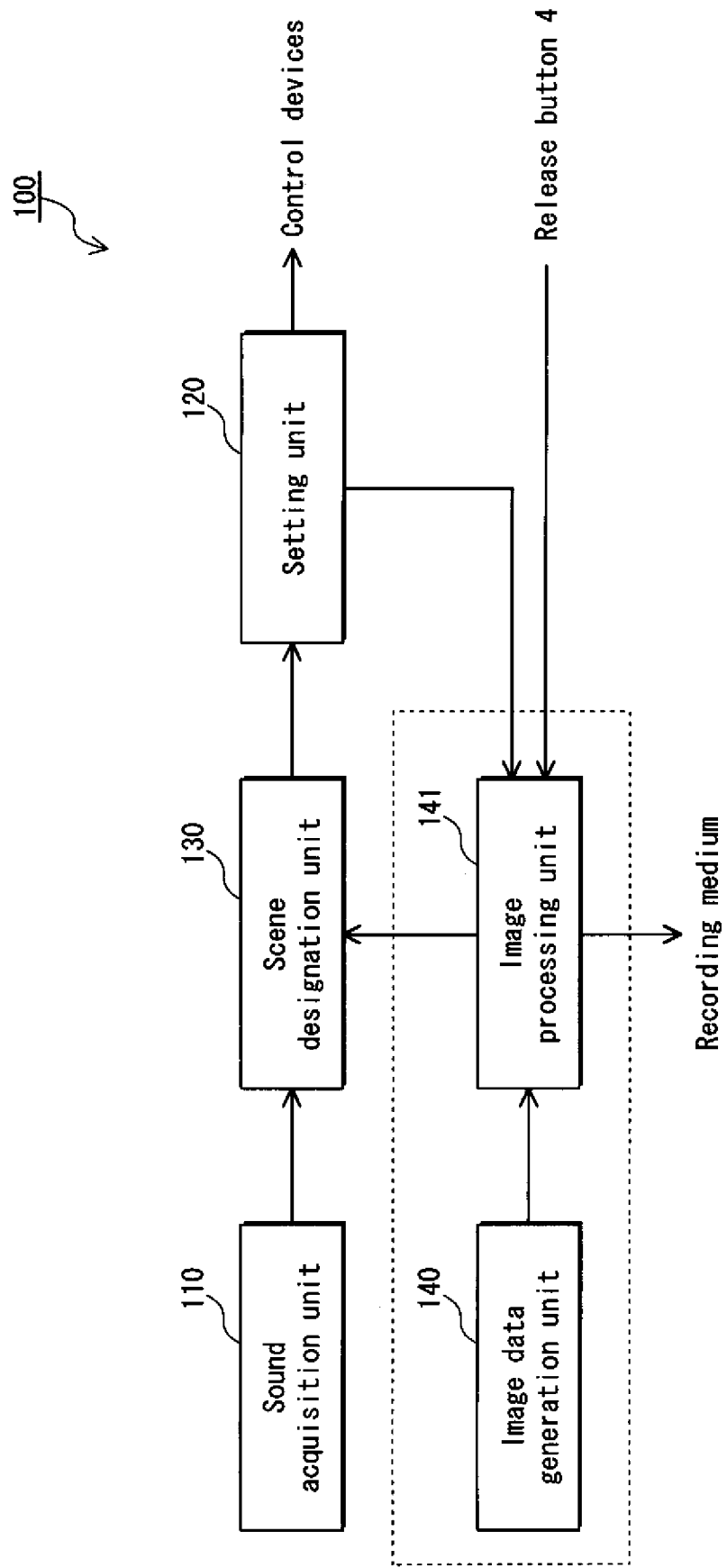

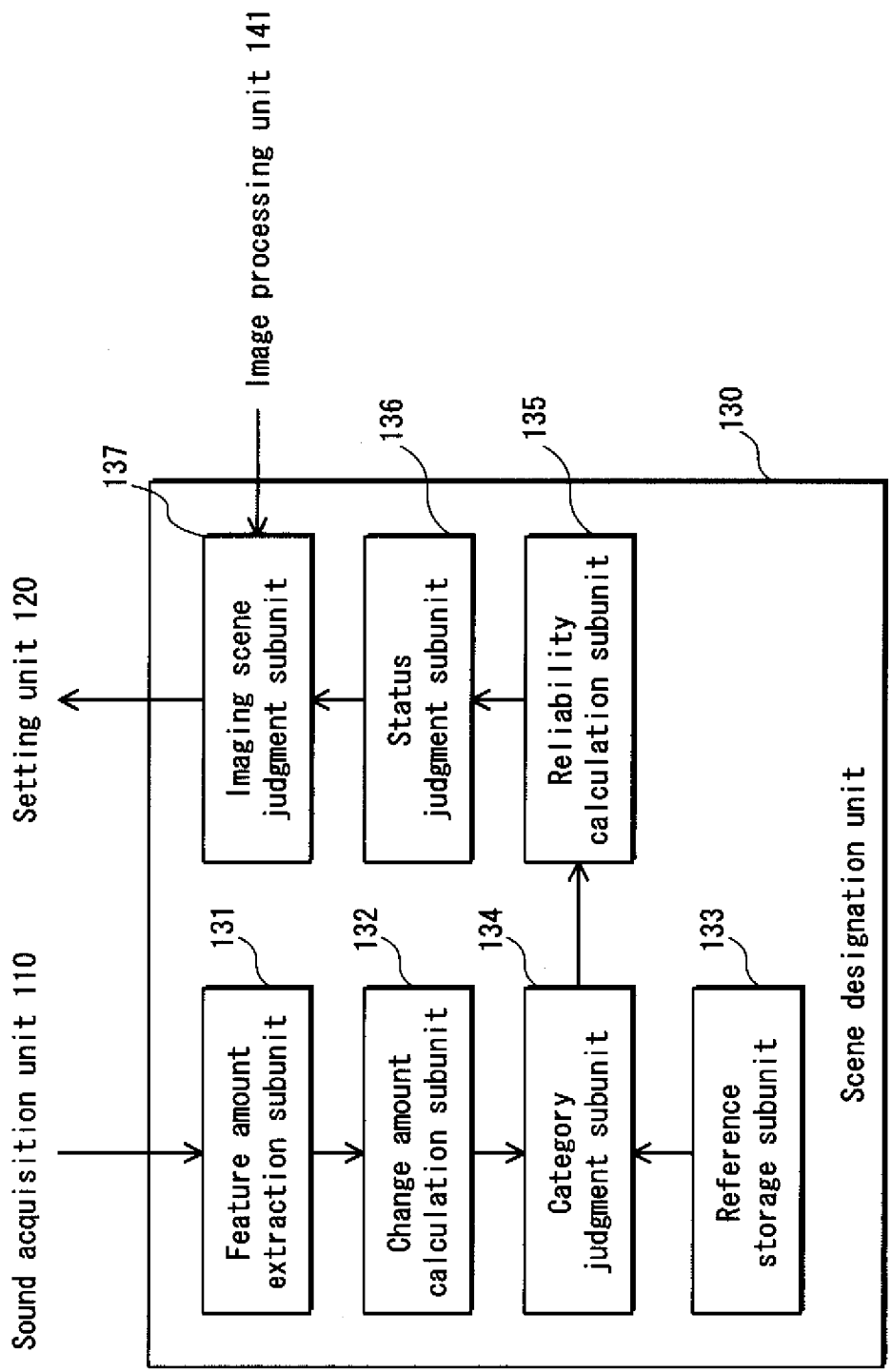

FIG. 4

| Sound category | Sound category identifier | Likelihood threshold value | Reliability threshold value |
|---|---|---|---|
| Indoor | a0 | La | Ra |
| Outdoor | b0 | Lb | Rb |
| Underwater | c0 | Lc | Rc |
| Vehicle | d0 | Ld | Rd |
| Fireworks | e0 | Le | Re |
| Party | f0 | Lf | Rf |
| Sports | g0 | Lg | Rg |
| Concert | h0 | Lh | Rh |
| Athletic event | i0 | Li | Ri |
| ... | ... | ... | ... |

FIG. 5

| Scene identifier | | Sound category weight values 22 | | | | Image category weight values 23 | | | | 20 |
|---|---|---|---|---|---|---|---|---|---|---|
| | | Indoor | Outdoor | Underwater | ... | Vehicle | Fireworks | Party | ... | |
| General indoor | S001 | wa1 | wb1 | wc1 | ... | wl1 | wm1 | wn1 | ... | |
| Indoor party | S002 | wa2 | wb2 | wc2 | ... | wl2 | wm2 | wn2 | ... | |
| General outdoor | S003 | wa3 | wb3 | wc3 | ... | wl3 | wm3 | wn3 | ... | |
| Outdoor fireworks | S004 | wa4 | wb4 | wc4 | ... | wl4 | wm4 | wn4 | ... | |
| Underwater | S005 | wa5 | wb5 | wc5 | ... | wl5 | wm5 | wn5 | ... | |
| ... | ... | ... | ... | ... | ... | ... | ... | ... | ... | |

FIG. 6

| Scene identifier | Setting values | | | | | |
|---|---|---|---|---|---|---|
| | Focus | Shutter speed | White balance | Sensitivity | Color emphasis | Flash |
| General indoor | S001 | AF | 1/60 | Fluorescent lamp | Standard | × | Auto |
| Indoor party | S002 | AF | 1/60 | Fluorescent lamp | Standard | Skin color | Auto |
| General outdoor | S003 | ∞ | 1/1000 | Sunlight | Standard | Natural color | Auto |
| Outdoor fireworks | S004 | ∞ | 3 | Auto | High sensitivity | × | Off |
| Underwater | S005 | AF | 1/2 | Underwater | Medium sensitivity | Underwater color | Off |
| ... | ... | ... | ... | ... | ... | ... | ... |

FIG. 10

| Scene title | Reference value | Short-term reliability | Long-term reliability | Average value (scene reliability) |
|---|---|---|---|---|
| General indoor | 0.5 | 0.6 | 0.4 | 0.5 |
| Indoor party | 0.7 | 0.5 | 0.4 | 0.45 |
| General outdoor | 0.5 | 0.1 | 0.1 | 0.1 |
| Outdoor fireworks | 0.7 | 0 | 0 | 0 |
| Underwater | 0.3 | 0 | 0 | 0 |
| ... | ... | ... | ... | ... |

| Scene title | Reference value | Short-term reliability | Long-term reliability | Average value (scene reliability) |
|---|---|---|---|---|
| General indoor | 0.5 | 0.5 | 0.4 | 0.45 |
| Indoor party | 0.7 | 0.5 | 0.3 | 0.4 |
| General outdoor | 0.5 | 0.1 | 0.1 | 0.1 |
| Outdoor fireworks | 0.7 | 0 | 0 | 0 |
| Underwater | 0.3 | 0 | 0 | 0 |
| ... | ... | ... | ... | ... |

| | Sound category identifier | Setting values | | | | |
|---|---|---|---|---|---|---|
| | | Short-distance range [m] | Middle-distance range [m] | Long-distance range [m] | White balance | Sensitivity |
| Indoor | a0 | 0~2.0 | 2.0~5.0 | 5.0~ | × | × |
| Outdoor | b0 | 0~5.0 | 5.0~10.0 | 10.0~ | × | × |
| Underwater | c0 | 0~0.5 | 0.5~1.0 | 1.0~ | × | × |
| Train | d1 | 0~1.0 | 1.0~3.0 | 3.0~ | Fluorescent lamp A | Standard A |
| Plane | d2 | 0~0.5 | 0.5~5.0 | 5.0~ | Fluorescent lamp B | Standard B |
| ... | ... | ... | ... | ... | ... | ... |

FIG. 18A

| Configuration identifier | Long-term sound reliability | | | | Registration date |
|---|---|---|---|---|---|
| | Indoor | Outdoor | Underwater | ... | |
| 1 | 0.5 | 0.3 | 0.15 | ... | 2008/3/1 10:10 |
| 2 | 0.15 | 0.2 | 0.1 | ... | 2008/3/3 14:22 |
| ... | ... | ... | ... | ... | ... |
| 100 | 0.51 | 0.28 | 0.13 | ... | 2008/12/1 10:30 |
| ... | ... | ... | ... | ... | ... |

FIG. 18B

| Group identifier | Member identifier |
|---|---|
| G1 | 1, 51, 100, ... |
| G2 | 2, 19, 22, 180, ... |
| G3 | 3, 82, 220, ... |
| ... | ... |

FIG. 18C

| Important group identifier | Member group identifier |
|---|---|
| IG1 | G1, G3, G6 |
| IG2 | G2, G8, G12 |

(12) United States Patent
US 8,675,096 B2

IMAGE CAPTURING DEVICE FOR SETTING ONE OR MORE SETTING VALUES FOR AN IMAGING MECHANISM BASED ON ACQUIRED SOUND DATA THAT INCLUDES INFORMATION REFLECTING AN IMAGING ENVIRONMENT

TECHNICAL FIELD

The present invention relates to an imaging device such as a digital still camera which is capable of capturing an image using setting values for imaging mechanism control that correspond to the image-capturing environment.

BACKGROUND ART

Some imaging devices (e.g. digital still cameras) are known to automatically identify image-capturing environments and control the imaging mechanism using setting values corresponding to the identified image-capturing environments (for example, Patent Literatures 1 and 2).

A digital camera according to Patent Literature 1 converts acquired one-screen RGB (Red, Green, and Blue) data to HSV (Hue, Saturation Chroma, Brightness Lightness Value) data, automatically identifies the image-capturing environment based on the distributions of the Hue data and the Saturation Chroma data, and controls the imaging mechanism using the setting values according to the identification result.

An electronic camera according to Patent Literature 2 automatically identifies the image-capturing environment based on the posture of the imaging lens in a swing direction, the brightness of the acquired image, and the imaging distance that have been detected using a sensor, and controls the imaging mechanism using the setting values corresponding to the identification result.

As described above, the cameras according to Patent Literatures 1 and 2 automatically identify the image-capturing environment and controls the imaging mechanism using the setting values according to the identification result, and consequently, the user does not need to perform detailed setting.

CITATION LIST

Patent Literature

[Patent Literature 1]
Japanese Laid-Open Patent Application Publication No. 2008-11289
[Patent Literature 2]
Japanese Laid-Open Patent Application Publication No. 2006-86758

SUMMARY OF INVENTION

Technical Problem

However, the cameras according to Patent Literatures 1 and 2 are not always able to set the setting values used for controlling the imaging mechanism appropriately.

The present invention has been conceived in view of this problem, and aims to provide an imaging device that is useful in performing the appropriate settings, using a different method.

Solution to Problem

In order to solve the stated problem, an imaging device of the present invention comprises: an imaging mechanism; a sound acquisition unit operable to acquire sound data that includes information reflecting an imaging environment; and a setting unit operable to, based on the sound data acquired by the sound acquisition unit, select and set one or more setting values for controlling the imaging mechanism.

Advantageous Effects of Invention

The imaging device with the stated structure pertaining to the present invention selects setting values based on the sound data originating from the image-capturing environment, and accordingly, for the imaging mechanism such as shutter speed, sensitivity of imaging elements and the like, is able to perform control appropriate for the image-capturing environment.

BRIEF DESCRIPTION OF DRAWINGS

FIG. 2 is a block diagram showing a functional structure of main units of the digital camera 100.

FIG. 3 is a block diagram showing a functional structure of a scene designation unit 130.

FIG. 4 shows a data structure and exemplary contents of a sound category reference table 10.

FIG. 5 shows a data structure and exemplary contents of a scene correspondence table 20.

FIG. 6 shows a data structure and exemplary contents of a setting table 30.

FIG. 10 shows, as examples, a reference value, and short-term reliability, long-term reliability, and scene reliability calculated by the imaging scene judgment subunit 137, for each imaging scene.

FIG. 12 shows, as examples, a reference value, and short-term reliability, long-term reliability, and scene reliability calculated by the modified scene judgment subunit, for each imaging scene.

FIG. 16 shows a data structure and exemplary contents of a setting table 60.

FIGS. 18A, 18B and 18C show data configurations and exemplary contents of a category configuration table 70, a group table 80, and an important group table 90.

DESCRIPTION OF EMBODIMENTS

The following describes a digital still camera (hereinafter, referred to simply as a "digital camera") as an embodiment of the imaging device pertaining to the present invention with reference to the drawings.

First Embodiment

A digital camera 100 pertaining to a first embodiment pre-stores, for each image-capturing environment (hereinafter, also referred to as an "imaging scene"), multiple setting values for imaging mechanism control that are appropriate for the imaging scene, automatically makes judgment on the imaging scene based on the ambient sound, and automatically sets setting values used for the imaging mechanism control that are appropriate for the imaging scene, thereby reducing an operational burden of the user and contributing to generation of clear images.

<Device Configuration>

First, the device configuration of the digital camera 100 pertaining to the first embodiment is described.

Figure 1B:
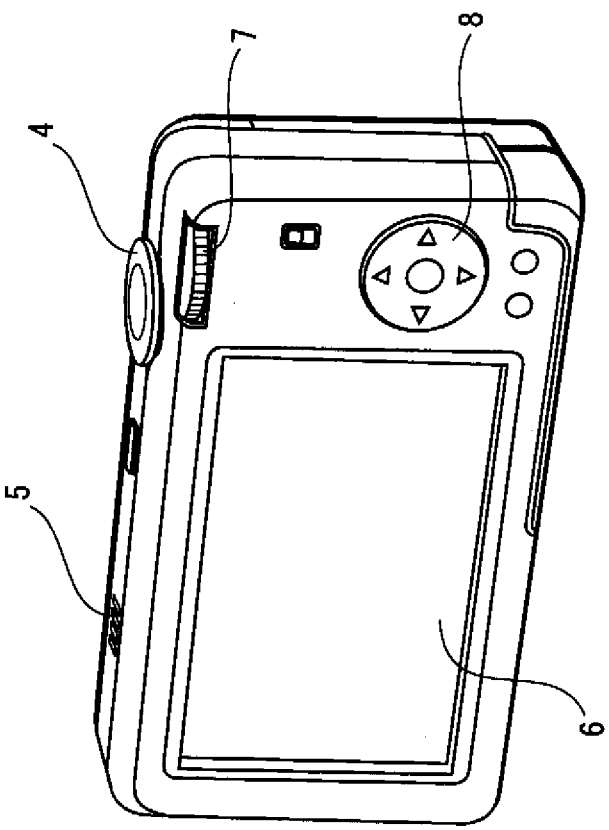
FIGS. 1A and 1B each are a perspective view showing an external appearance of a digital camera 100.
Figure 1A:
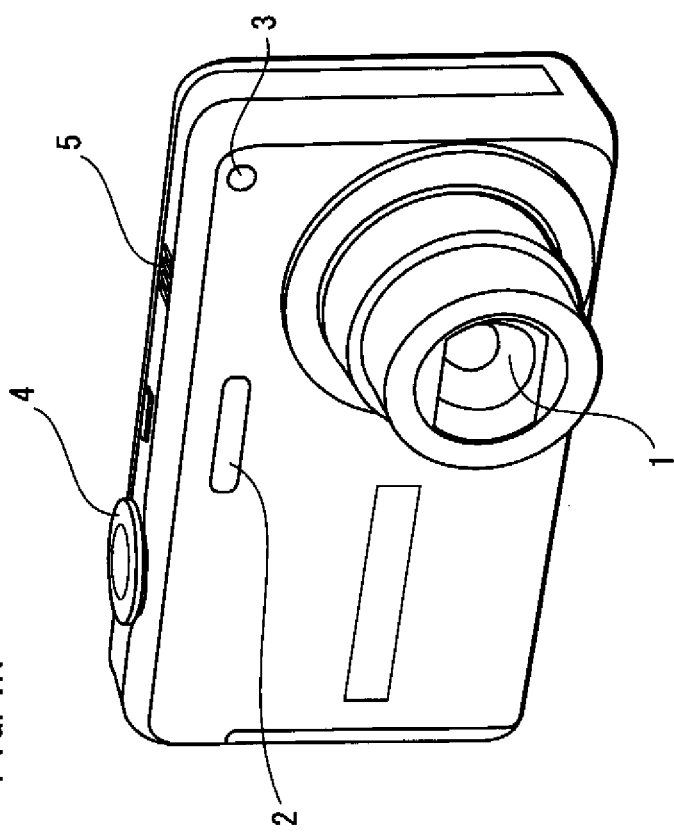

FIG. 1A is a perspective view showing an external appearance of front and upper portions of the digital camera 100, and FIG. 1B is a perspective view showing an external appearance of back and upper portions of the digital camera 100.

As shown in FIG. 1A, an imaging lens 1, a strobe light emitter 2, and a sensor 3 are arranged at the front portion of the digital camera 100. The imaging lens 1 forms an image onto an imaging element such as a CCD (Charge Coupled Device), a CMOS (Complementary Metal Oxide Semiconductor), or the like using light from a subject; the strobe light emitter 2 emits light toward the subject when image-capturing; and the sensor 3 senses the distance from the subject, the exposure, the rotation direction of the digital camera 100, and the like. At the upper portion of the digital camera 100, a release button 4 and a speaker microphone 5 are arranged: the release button 4 is able to issue an instruction for focusing when held down halfway by the user, and to issue an instruction for image-capturing when held down all the way; and the speaker microphone 5 collects external sound reflecting the image-capturing environment and reverberating sound occurring as a result of outputting predetermined sound.

Also, as shown in FIG. 1B, a display 6, a dial button 7, and an operation panel 8 are arranged at the back portion of the digital camera 100. The display 6 displays a captured image, various information, and the like; the dial button 7 allows the user to specify an operation mode (manual mode, automatic optimization mode, moving image mode, etc.) of the digital camera 100; and the operation panel 8 is for receiving an user operation such as an operation for changing setting or an operation for displaying the captured image. Note that hereinafter, it is assumed that the digital camera 100 automatically sets the setting values for the imaging mechanism control that are appropriate for the imaging scene only in cases where the automatic optimization mode is specified by the dial button 7.

<Functional Structure>

Described next is a functional structure of the digital camera 100 pertaining to the first embodiment.

FIG. 2 is a block diagram showing the functional structure of main units of the digital camera 100.

As shown in FIG. 2, the digital camera 100 includes a sound acquisition unit 110, a setting unit 120, a scene designation unit 130, an image data generation unit 140, and an image processing unit 141.

Note that the digital camera 100 also includes a DSP (Digital Signal Processor), a processor, and a memory, and the functions of the setting unit 120, the scene designation unit 130, and the image processing unit 141 are realized as the DSP and the processor execute programs stored in the memory.

Here, the sound acquisition unit 110 includes the speaker microphone 5 and an A/D converter (not shown). The sound acquisition unit 110 converts external sound collected by the speaker microphone 5 to electric signals, and transmits, to the scene designation unit 130, sound data obtained by converting the electric signals to digital signals by use of the A/D converter. Note that while the sound acquisition unit 110 includes the speaker microphone 5 in this case, the sound acquisition unit 110 may include an input terminal for inputting electric signals output from an external microphone, to the digital camera 100.

The setting unit 120 retains, for each imaging scene, a table in which setting values for imaging mechanism control that are appropriate for the imaging scene have been registered (hereinafter, referred to as a "setting table"), and transmits the setting values corresponding to the imaging scene designated by the scene designation unit 130, to control devices and the image processing unit 141. Note that the contents and the like of the setting table are described later (see FIG. 6).

Here, the control devices include, for example, a device for controlling the focus of the imaging lens 1, a device for controlling the speed of the shutter (not shown), and a device for controlling whether or not to cause the strobe light emitter 2 to emit light.

The scene designation unit 130 is capable of designating one imaging scene based on values of one or more features of sound data (hereinafter referred to as "feature amounts") received from the sound acquisition unit 110 and image category information (described later) received from the image processing unit 141.

It should be noted that while the scene designation unit 130 designates the imaging scene based not only on the feature amounts of the sound data but also on the image category information received from the image processing unit 141 here, the scene designation unit 130 can designate the imaging scene based only on the feature amounts of the sound data. In other words, the image data generation unit 140 and the image processing unit 141 shown in an area indicated by dotted lines in FIG. 2 are not essential functional constituent elements for realizing the features of the present invention.

Below, a detailed functional structure of the scene designation unit 130 is explained using FIG. 3.

FIG. 3 is a block diagram showing the functional structure of the scene designation unit 130.

As shown in FIG. 3, the scene designation unit 130 includes a feature amount extraction subunit 131, a change amount calculation subunit 132, a reference storage subunit 133, a category judgment subunit 134, a reliability calculation subunit 135, a status judgment subunit 136, and an imaging scene judgment subunit 137.

Note that although separately described as the feature amount extraction subunit 131 and the change amount calculation subunit 132 in the present embodiment, an extraction subunit pertaining to the present invention can be structured as one functional unit In the following, the scene designation unit 130 processes sound data of a unit duration (e.g. one second) as one unit, and sound data of the unit duration being currently processed is also referred to as "target data".

Here, the feature amount extraction subunit 131 extracts one or more feature amounts for the target data received from the sound acquisition unit 110, and transmits the extracted feature amounts to the change amount calculation subunit 132. Each feature amount is a vector quantity composed of, as components, two or more attributes among attributes of sound represented by the power of sound, zero crossing, spectrum-related feature amounts, cepstrum-related feature amounts, a chroma vector, etc. The spectrum-related feature amounts and cepstrum-related feature amounts include spectral roll-off, MFCC (Mel Frequency Cepstrum Coefficient) and the like. Other than these, there are also multiple features specified as MPEG-7 audio features in the MPEG-7 (Moving Picture Experts Group Phase 7) standard. Low-level feature amounts include Audio Power, Audio Spectrum Envelope, Audio Spectrum Centroid, Harmonic Spectral Deviation, Harmonic Spectral Spread, etc. Note that details thereof are described in "MPEG-7 AUDIO AND BEYOND" by Hyoung-Gook Kim et al. (John Wiley & Sons Ltd., 2005).

The change amount calculation subunit 132 calculates, for each feature amount received from the feature amount extraction subunit 131, a change amount indicating how much the feature amount has changed with respect to a corresponding feature amount received immediately prior to the feature amount.

Also, the change amount calculation subunit 132 retains a threshold value for each feature, and only when the calculated change amount of the feature amount is lower than or equal to the corresponding threshold value, transmits the feature amount received from the feature amount extraction subunit 131 to the category judgment subunit 134.

This is because a large change amount is assumed to indicate occurrence of an accidental sound, and judgment on imaging scenes may not be correctly made based on the feature amount associated with a large change amount.

The reference storage subunit 133 is a memory area for storing, for each of pre-defined sound categories (for example, indoor, outdoor, underwater, vehicle, fireworks, party, sports, concert, athletic event, exposition, etc.), a model information piece composed of feature amounts that are to be classified into the sound category.

Note that each model information piece includes information indicating an average value and a variance value as values of each component of the vector quantity.

The category judgment subunit 134 performs matching processing between the feature amounts transmitted from the change amount calculation subunit 132 and the model information pieces stored in the reference storage subunit 133, and calculates likelihoods each indicating a matching degree.

In performing the matching processing, for example, a discriminator which incorporates a machine learning method is used. Ordinary discriminators include a GMM (Gaussian Mixture Model), an SVM (Support Vector Machine), and the like.

The model information pieces that are stored in the reference storage subunit 133 in one-to-one correspondence with the sound categories are sequentially set to a discriminator, and then subjected to the matching processing with the feature amounts transmitted from the feature amount extraction subunit 131. As a result, the likelihoods are calculated. The greater the likelihood of the target data for a sound category, the higher the reliability of the target data being classified into that sound category. The following explanation is provided under the assumption that each likelihood takes on a value in a range of zero to one.

For each sound category, the category judgment subunit 134 transmits, to the reliability calculation subunit 135, a set of a sound category identifier indicating the sound category and the likelihood calculated for the sound category. Hereinafter, each set is referred to as "sound likelihood information".

For each likelihood, the reliability calculation subunit 135 calculates reliability of the likelihood (hereinafter, referred to as "relative reliability") based on the sound likelihood information transmitted from the category judgment subunit 134.

Here, for example, when the likelihood of the target data with respect to the sound category A and the likelihood of the target data with respect to the sound category B have the same value, one of these likelihoods associated with the sound category whose model has a smaller variance value is considered to have higher reliability.

Assume a case where the likelihood of the target data α with respect to the sound category A and the likelihood of the target data β with respect to the sound category A have the same value. In this case, if the likelihood of the target data α with respect to the sound category B is smaller than the likelihood of the target data β with respect to the sound category B, then the likelihood of the target data α with respect to the sound category A has higher reliability. This is because the reliability of classifying the target data α into the sound category B is lower.

Accordingly, the reliability calculation subunit 135 calculates relative reliabilities with the variance values of the models corresponding to the sound categories and distances from the centers (i.e. average values) of other models taken into consideration.

For example, assume that the likelihoods of target data with respect to three sound categories A, B and C are a, b and c, respectively, and that variance values of the models corresponding to these sound categories are p, q and r, respectively, a relative reliability Xa with respect to the sound category A is calculated using the equation below. Note that because a relative reliability Xb with respect to the sound category B and a relative reliability Xc with respect to the sound category C can be calculated in a similar manner, equations for calculating the relative reliabilities Xb and Xc are omitted.

$$Xa = \sqrt{[(a-p)-(b-q)]^2 + [(a-p)-(c-r)]^2} \quad \text{[Equation 1]}$$

This equation indicates that the larger the value of the relative reliability Xa is, the greater the likelihood a is.

For each sound category, the reliability calculation subunit 135 transmits a set of a sound category identifier, a likelihood, and a relative reliability for the sound category, to the status judgment subunit 136. Hereinafter, each set is referred to as "reliability information".

The status judgment subunit 136 retains a sound category reference table shown in FIG. 4, and designates one or more sound categories to which the target data is estimated to belong, based on the sound category reference table and the reliability information received from the reliability calculation subunit 135.

The sound category reference table (described later in detail) is a table in which, for each category, a lower limit of the likelihood (hereinafter, referred to as a "likelihood threshold value") and a lower limit of the relative reliability (hereinafter, referred to as a "reliability threshold value") for the sound category have been registered.

For each of the sets pertaining to the sound categories constituting the reliability information, the status judgment subunit 136 judges whether or not the following criterion is satisfied: the likelihood and the relative reliability included in the set are higher than or equal to the likelihood threshold value and the reliability threshold value of the corresponding sound category, respectively. The status judgment subunit 136 designates each sound category pertaining to the sets that satisfy the criterion as the one or more sound categories to which the target data is estimated to belong.

Also, when designating the one or more sound categories, the status judgment subunit 136 judges validity of the designation result based on designation results from the past, and when the designation result is judged to be valid, transmits to the imaging scene judgment subunit 137 information including sound category identifiers and relative likelihoods included in the sets pertaining to the designated sound categories, among the sets pertaining to the sound categories constituting the reliability information (hereinafter, referred to as "sound category information"). Note that although the method for judging the validity of the designation result is described later (see FIG. 7), in order to judge the imaging scene more accurately based on the designated sound categories, the designation result is not used for jading the imaging scene in a case where the designated one or more sound categories change frequently.

The imaging scene judgment subunit 137 calculates reliability for each imaging scene based on the sound category information transmitted from the status judgment subunit 136, the image category information transmitted from the image processing unit 141, and the scene correspondence table shown in FIG. 5 (hereinafter, referred to as "unit time reliability"), and designates one of the imaging scenes (general indoor, indoor party, indoor concert, general outdoor, outdoor fireworks, outdoor sports, outdoor athletic event, underwater, etc.) based on a plurality of unit time reliabilities including unit time reliabilities for the imaging scenes calculated in the past. Upon designating one imaging scene, the imaging scene judgment subunit 137 transmits information indicating the designated imaging scene (hereinafter, referred to as a "scene identifier") to the setting unit 120.

The scene correspondence table (described later in detail) is a table in which, for each imaging scene, weight values indicating at what degree the imaging scene is related to the sound categories and image categories are registered.

FIG. 2 is used here again to explain the remaining units of the digital camera 100.

The image data generation unit 140 includes the imaging lens 1, the imaging element such as a CCD or a CMOS, and the A/D converter. The image data generation unit 140 generates image data (for example, a brightness data group of 640×480 pixels) by collecting incident light from the subject onto the CCD or the like using the imaging lens 1, converting the light to an electric signal at the CCD or the like, and converting the electric signal to a digital signal with the use of the A/D converter. Thereafter, the image data generation unit 140 transmits the generated image data to the image processing unit 141.

The image processing unit 141 has functions similar to a portion of the respective units constituting the scene designation unit 130. The image processing unit 141 calculates a likelihood and a relative reliability for each of pre-defined image categories (for example, indoor, outdoor, underwater, fireworks, etc,) based on values of one or more features (feature amounts) of the image data received from the image data generation unit 140, and designates one or more image categories to which the image data is estimated to belong, based on the calculated likelihood and relative reliability. The image processing unit 141 transmits image category information indicating the designation result to the imaging scene judgment subunit 137.

The image processing unit 141 extracts, as the one or more feature amounts, for example, a brightness component, a color difference component, and the like, and converts the extracted feature amounts to Bag of Features (hereinafter, referred to as "BoF") represented by a color histogram for judging an imaging scene, a SIFT (Scale-Invariant Feature Transform) for judging an object, or the like.

Although not shown, the image processing unit 141 stores a model information piece for each pre-defined image category, the model information piece being composed of feature amounts to be classified into the image category. The image processing unit 141 also performs matching processing between the BoF and the stored model information pieces, calculates likelihoods which each indicate a matching degree, and calculates relative reliability for each likelihood according to the equation shown as Equation 1.

The image processing unit 141 also has the functions of (i) upon receiving from the release button 4 a notification indicating that an instruction for image capturing has been made, performing image processing such as color correction on the image data received from the image data generation unit 140, according to the setting values received from the setting unit 120, and (ii) storing the resultant image data onto a recording medium.

<Data>

The following explains data used in the digital camera 100.

<Sound Category Reference Table>

FIG. 4 shows the data structure and exemplary contents of the sound category reference table 10.

The sound category reference table 10 is a table in which, for each sound category, a piece of data associating a sound category identifier 11, a likelihood threshold value 12, and a reliability threshold value 13 with one another is registered, and is referred to by the status judgment subunit 136 when designating one or more sound categories to which the target data is estimated to belong.

It is assumed that each of "La" to "Li" and "Ra" to "Ri" shown in FIG. 4 indicates a specific numeric value.

Here, each sound category identifier 11 is identification information for identifying a corresponding sound category, and in the example of FIG. 4, each sound category identifier 11 is assigned a different one of character strings.

The likelihood threshold value 12 is a lower limit value of the calculated likelihood, which allows estimating that the target data belongs to the corresponding sound category. The reliability threshold value 13 is a lower limit value of the calculated relative reliability, which allows estimating that the target data belongs to the corresponding sound category.

By way of example, FIG. 4 indicates the following: the likelihood threshold value and the relative reliability threshold value that allow the target data to be estimated to belong to the sound category assigned the sound category identifier "a0" (i.e., outdoor) are "La" and "Ra", respectively.

<Scene Correspondence Table>

FIG. 5 shows the data structure and exemplary contents of the scene correspondence table 20.

The scene correspondence table 20 is a table in which, for each imaging scene, a piece of data associating a scene identifier 21, sound category weight values 22, and image category weight values 23 with one another is registered, and is referred to by the imaging scene judgment subunit 137 when calculating unit time reliability.

It is assumed that each of "Wa1" to "Wn5" shown in FIG. 5 indicates a specific numerical value less than or equal to 1.

Here, the scene identifier 21 is identification information for identifying a corresponding imaging scene, and in the example of FIG. 5, each scene identifier 21 is assigned a different one of character strings.

Each of the sound category weight values 22 is a value indicating a degree of relationship to the corresponding imaging scene and the corresponding sound category. Each of the image category weight values 23 is a value indicating a degree of relationship to the corresponding imaging scene and the corresponding image category. A set of the sound category weight values and the image category weight values that are mutually associated with each imaging scene is determined so as to add up to a total of one.

FIG. 5 shows that, for example, an imaging scene with a scene identifier of "S001" (i.e. general indoor) has the following weight values: a sound category weight value for indoor is "Wa1"; a sound category weight value of outdoor is "Wb1"; a sound category weight value for underwater is "Wc1"; an image category weight value for vehicle is "Wl1"; an image category weight value for fireworks is "Wm1"; and an image category weight value for party is "Wn1".

<Setting Table>

FIG. 6 shows the data structure and exemplary contents of the setting table 30.

The setting table 30 is a table in which, for each imaging scene, a piece of data associating a scene identifier 31 with setting values 32 is registered, and is referred to by the setting unit 120 when acquiring setting values that correspond to the imaging scene and are used to control the imaging mechanism.

Here, each of the scene identifiers 31 is identification information for identifying a corresponding imaging scene, and coincides with one of the scene identifiers in the scene correspondence table 20.

The setting values 32 are setting values for controlling the image mechanism, which are appropriate for the corresponding imaging scene, and include setting values for items such as focus, shutter speed, white balance, sensitivity, color emphasis, and flash. Note that a mark "x" in a color emphasis field indicates that no color emphasis is particularly made.

By way of example, FIG. 6 indicates that the setting values for controlling the imaging mechanism that are appropriate for the imaging scene with a scene identifier of "S001" (i.e. general indoor) are as follows: focus is "AF (Auto Focus)"; shutter speed is "1/60" seconds; white balance is a pre-defined value for a case where a light source is a "fluorescent lamp"; sensitivity of the CCD etc. is "standard"; color emphasis is "x" (i.e. not made); and flash is "auto".

<Operations>

The following explains operations of the digital camera 100.

<Sound Category Designation Processing>

Figure 7:
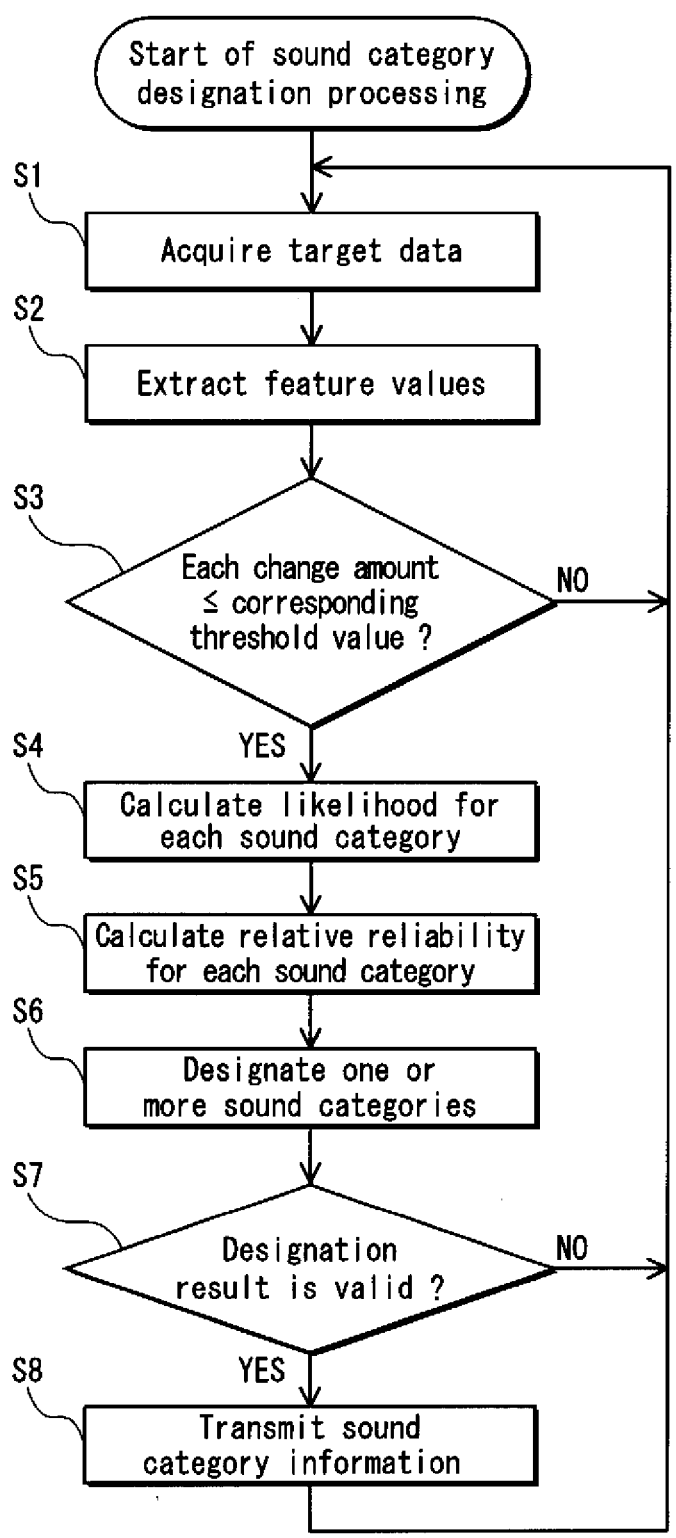
FIG. 7 is a flowchart showing sound category designation processing performed by the scene designation unit 130.

FIG. 7 is a flowchart showing sound category designation processing performed by the scene designation unit 130.

This sound category designation processing starts when the digital camera 100 is put in a state of being able to perform image-capturing, such as when the power is turned ON by a user, and the dial button 7 shown in FIG. 1B is set to the automatic optimization mode. The sound category designation processing ends when the digital camera 100 is put in a state of being unable to perform image-capturing, such as when the power is turned OFF by a user (not shown).

As shown in FIG. 7, upon acquiring sound data of a unit duration (target data) via the sound acquisition unit 110 (step S1), the feature amount extraction subunit 131 of the scene designation unit 130 extracts feature amounts (step S2), and transmits the extracted feature amounts to the change amount calculation subunit 132.

The change amount calculation subunit 132 calculates, for each feature amount received from the feature amount extraction subunit 131, the change amount thereof with respect to the corresponding feature amount received immediately prior to the feature amount, and judges whether each calculated change amount is less than or equal to a corresponding threshold value or not (step S3).

When at least one of the calculated feature amounts is greater than or equal to the corresponding threshold value (step S3: NO), the scene designation unit 130 performs the processing from step S1 again. When all of the calculated feature amounts are smaller than or equal to the corresponding threshold values (step S3: YES), the change amount calculation subunit 132 transmits the feature amounts received from the feature amount extraction subunit 131 to the category judgment subunit 134.

Note that in a case of receiving the feature amounts from the feature amount extraction subunit 131 immediately after the digital camera 100 is put in a state of being able to perform image-capturing, the change amount calculation subunit 132 judges affirmatively (step S3: YES).

The category judgment subunit 134 performs matching processing between the feature amounts received from the change amount calculation subunit 132 and the model information pieces stored in the reference storage subunit 133, calculates likelihoods each indicating a degree of matching (step S4), and for each sound category, transmits a set of a sound category identifier and the likelihood calculated for the sound category (sound likelihood information) to the reliability calculation subunit 135.

The reliability calculation subunit 135 calculates, based on the likelihoods included in the sound likelihood information received from the category judgment subunit 134, relative reliabilities according to the equation shown as Equation 1 (step S5). And for each sound category, the reliability calculation subunit 135 transmits to the status judgment subunit 136 a set of a sound category identifier, the likelihood and the relative reliability for the sound category (reliability information).

The status judgment subunit 136 designates one or more sound categories to which the target data is estimated to belong, based on the sound category reference table 10 and the reliability information received from the reliability calculation subunit 135 (step S6). More specifically, for each sound category, the status judgment subunit 136 (i) acquires a likelihood threshold value and a reliability threshold value for the sound category from the sound category reference table 10, (ii) acquires a likelihood and relative reliability for the sound category from the reliability information received from the category judgment subunit 134, and (iii) when the likelihood and the relative reliability are respectively higher than or equal to the likelihood threshold value and the reliability threshold value, designates the sound category as being included in the one or more sound categories to which the target data is estimated to belong.

For example, in an example case of the sound category reference table 10 shown in FIG. 4, when the likelihood included in a set with a sound category of "a0" constituting the relative reliability is higher than or equal to "La" and the relative reliability included in the set is higher than or equal to "Ra", "indoor" is designated as a sound category to which the target data is estimated to belong.

The status judgment subunit 136 also judges whether the designation result in step S6 is valid or not, based on whether at least a portion of the designated sound categories overlaps with one or more sound categories designated for sound data Dn−1 and sound data Dn−2, respectively, which have the unit duration and were processed one data piece and two data pieces immediately prior to the target data Dn, respectively (step S7).

Specifically, only when at least a portion of the sound categories designated in step S6 is included in both of (a) the one or more sound categories designated for the sound data Dn−1 and (b) the one or more sound categories designated for the sound data Dn−2, the status judgment subunit 136 judges affirmatively (step S7: YES).

For example, assume "indoor" and "party" were designated as the sound categories in step S6. In this case, the status judgment subunit 136 judges affirmatively when "indoor" is included in both of the one or more sound categories designated for the sound data Dn−1 and the one or more sound categories designated for the sound data Dn−2, or when "party" is included in both of the one or more sound categories designated for the sound data Dn−1 and the one or more sound categories designated for the sound data Dn−2 (step S7: YES).

When the status judgment subunit 136 judges negatively in step S7 (step S7: NO), the scene designation unit 130 performs the processing from step S1 again. When the status judgment unit sub 136 judges affirmatively in step S7 (step S7: YES), the status judgment subunit 136 transmits sound category information to the imaging scene judgment subunit 137 (step S8), and the scene designation unit 130 performs the processing from step S1 again.

Here, the sound category information is information associating, for each sound category, a sound category identifier with relative reliability. As the relative reliability, (a) for each sound category designated in step S6, the relative reliability for the sound category included in the reliability information received from the reliability calculation subunit 135 is associated with the corresponding sound category identifier, and (b) for each sound category not designated in step S6, "0" is associated with the corresponding sound category identifier.

<Image Category Designation Processing>

Figure 8:
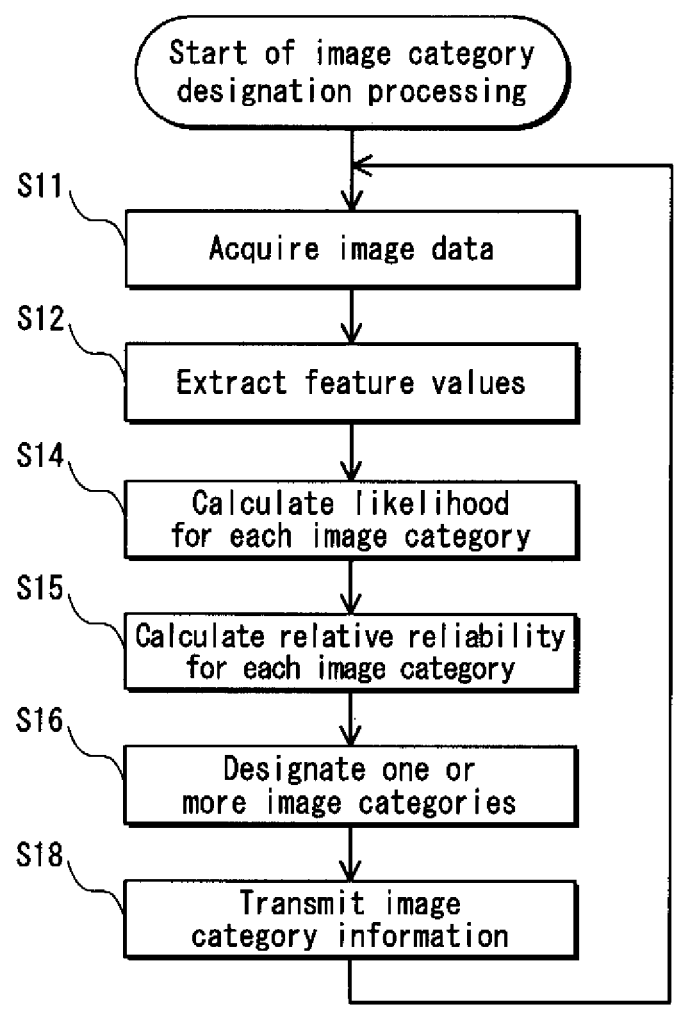
FIG. 8 is a flowchart showing image category designation processing performed by an image processing unit 141.

FIG. 8 is a flowchart showing image category designation processing performed by the image processing unit 141.

Because the flow of this image category designation processing is similar to that of the sound category designation processing explained using FIG. 7, it is briefly explained here.

Similarly to the sound category designation processing, the image category designation processing starts when the digital camera 100 is put in a state of being able to perform imaging-capturing, and the dial button 7 is set to the automatic optimization mode. The image category designation processing ends when the digital camera 100 is put in a state of being unable to perform imaging-capturing.

As shown in FIG. 8, upon acquiring image data from the image data generation unit 140 (step S11), the image processing unit 141 extracts feature amounts (step S12), performs matching processing between BoF obtained by converting the extracted feature amounts and model information pieces of image categories, and calculates likelihoods each indicating a degree of matching (step S14).

The image processing unit 141 also calculates, based on each calculated likelihood, relative reliability according to the equation shown as Equation 1 (step S15), and designates one or more image categories to which the image data is estimated to belong, based on a set of likelihood and reliability information for each image category (step S16).

Although no particular explanation has been given, the image processing unit 141 retains a table, a data structure of which is very similar to that of the sound category reference table 10. In this table retained by the image processing unit 141, a likelihood threshold value and a reliability threshold value are registered for each image category. Similarly to the status judgment subunit 136, when the likelihood and the relative reliability in each set are respectively higher than or equal to the likelihood threshold value and the reliability threshold value for the corresponding image category, the image processing unit 141 designates the corresponding image category as an image category to which the image data is estimated to belong.

The image processing unit 141 transmits image category information to the imaging scene judgment subunit 137 (step S18), and the image processing unit 141 performs the processing from step S11 again.

Here, the image category information is information associating, for each image category, an image category identifier with relative reliability. As the relative reliability, (a) for each image category designated in step S16, the relative reliability for the image category calculated in step S15 is associated with the corresponding image category identifier, and (b) for each image category not designated in step S16, "0" is associated with the corresponding image category identifier.

<Imaging Scene Judgment Processing>

Figure 9:
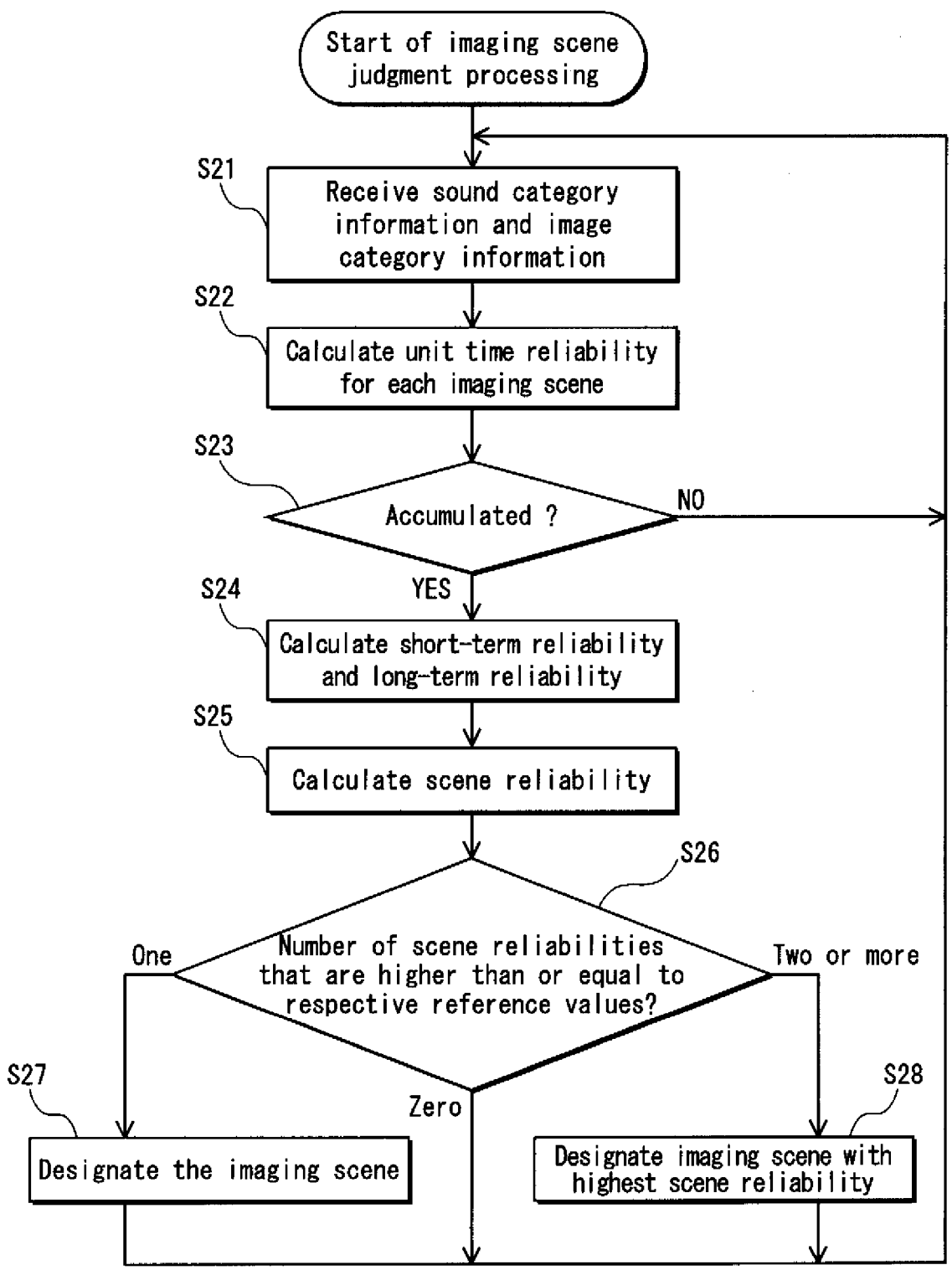
FIG. 9 is a flowchart showing imaging scene judgment processing performed by an imaging scene judgment subunit 137.

FIG. 9 is a flowchart showing imaging scene judgment processing performed by the imaging scene judgment subunit 137.

As shown in FIG. 9, upon receiving the sound category information from the status judgment subunit 136 and the image category information from the image processing unit 141 (step S21), the imaging scene judgment subunit 137 of the scene designation unit 130 calculates unit time reliability for each imaging scene using the scene correspondence table 20 (step S22), and accumulates the calculated unit time reliability for each imaging scene.

More specifically, for each imaging scene, the unit time reliability is calculated in the following manner: each relative reliability included in the sound category information is multiplied by a corresponding sound category weight value in the scene correspondence table 20, and multiplication results obtained for all the relative reliabilities included in the sound category information are summated; each relative reliability included in the image category information is multiplied by a corresponding image category weight value in the scene correspondence table 20, and multiplication results obtained for all the relative reliabilities included in the image category information are summated; and the total of these summation results is the unit time reliability.

For example, assume that relative reliabilities for the sound categories such as "indoor", "outdoor", "underwater", . . . included in the sound category information are "Xa1", "Xb1", "Xc1", . . . , respectively, and relative reliabilities for the image categories such as "vehicle", "fireworks", "party", . . . included in the image category information are "Xl1", "Xm1", "Xn1", . . . . In this case, according to the example of the scene correspondence table 20 shown in FIG. 5, the unit time reliability for an imaging scene "general indoor" can be obtained by the following calculation: "wa1× Xa1+wb1×Xb1+wc1×Xc1+ . . . +wl1×Xl1+wm1×Xm1+ wn1×Xn1+ . . . ".

The imaging scene judgment subunit 137 judges whether or not unit time reliabilities for each imaging scene calculated for sound data Dn−1 to Dn−4 that each have the unit duration and that were processed one data piece to four data pieces immediately prior to the target data Dn have been accumulated (step S23).

Note that when a negative judgment is made in the judgment processing in step S3 or step S7 in FIG. 7, the sound category information of the sound data being the processing target at that time has not been received from the status judgment subunit 136, and accordingly, the unit time reliability based on the sound category information has not been accumulated.

When the unit time reliability has not been accumulated for each of the imaging scenes (step S23: NO), the scene designation unit 130 performs the processing from step S21 again. When the unit time reliability has been accumulated for each of the imaging scenes (step S23: YES), short-term reliability and long-term reliability are calculated for each imaging scene based on the unit time reliabilities for the imaging scenes calculated with respect to the sound data Dn to Dn−4 (step S24).

Here, the short-term reliability for an imaging scene is an average value of the unit time reliabilities for the imaging scene calculated with respect to the sound data Dn and Dn−1, and the long-term reliability for an imaging scene is an average value of the unit time reliabilities for the imaging scene calculated with respect to the sound data Dn to Dn−4.

For example, when the unit time reliabilities for an imaging scene "general indoor" calculated with respect to the sound data Dn to Dn−4 are "Sa0" to "Sa4", the short-term reliability and the long-term reliability for the imaging scene "general indoor" are calculated by "(Sa0+Sa1)/2" and "(Sa0+Sa1+Sa2+Sa3+Sa4)/5", respectively.

Next, the imaging scene judgment subunit 137 calculates, for each imaging scene, an average value of the short-term reliability and the long-term reliability of the imaging scene (hereinafter, referred to as "scene reliability") (step S25).

The imaging scene judgment subunit 137 judges whether the scene reliability calculated for each imaging scene is higher than or equal to a reference value pre-defined for the imaging scene, and determines the number of scene reliabilities higher than or equal to the respective reference values (step S26).

When the number of the scene reliabilities higher than or equal to the respective reference values is zero (step S26: "Zero"), no processing is performed in particular, and the imaging scene judgment subunit 137 performs the processing from step S21 again. When the number of the scene reliabilities higher than or equal to the respective reference values is one (step S26: "One"), the imaging scene judgment subunit 137 designates the imaging scene pertaining to the scene reliability that is higher than or equal to the corresponding reference value (step S27), transmits the scene identifier of the designated imaging scene to the setting unit 120, and performs the processing again from step S21.

Having received the scene identifier, the setting unit 120 acquires setting values corresponding to the received scene identifier from the setting table 30, and transmits the acquired setting values to corresponding control devices and the image processing unit 141. As a result, the control devices and the image processing unit 141 perform processing according to the received setting values.

When the number of the scene reliabilities higher than or equal to the respective reference values is two or more (step S26: "Two or more"), the imaging scene judgment subunit 137 designates the imaging scene pertaining to the highest scene reliability (step S28), transmits the scene identifier of the designated imaging scene to the setting unit 120, and performs the processing from step S21 again. Subsequent processing by the setting unit 120, the control devices, and the image processing unit 141 are the same as those in step S27.

Specific Example

The following explains processing from step S26 onward, using a specific example.

By way of example, FIG. 10 shows a reference value, and short-term reliability, long-term reliability, and scene reliability calculated by the imaging scene judgment subunit 137, for each imaging scene.

In the example shown in FIG. 10, among all the calculated scene reliabilities 42, only the scene reliability pertaining to the imaging scene "general indoor" is higher than or equal to the corresponding reference value (step S26: "One"), and accordingly, the imaging scene judgment subunit 137 designates the present imaging scene as "general indoor" (step S27), and transmits a scene identifier (S001) for "general indoor" to the setting unit 120.

Having received the scene identifier (S001), the setting unit 120 acquires setting values such as focus "AF", shutter speed "1/60", white balance "fluorescent lamp", color emphasis "x", and flash "auto" in the example of the setting table 30 shown in FIG. 6.

The setting unit 120 transmits the setting values such as focus "AF", shutter speed "1/60", and flash "auto" to corresponding control devices, and transmits the setting values such as white balance "fluorescent lamp" and color emphasis "x" to the image processing unit 141. The control devices and the image processing unit 141 then perform processing according to the received setting values.

<First Modification>

In the first embodiment, an explanation has been given on an example case where one imaging scene is automatically designated and setting values corresponding to the designated imaging scene are applied. In the following, an explanation is given on a modification example of presenting candidates for the imaging scene to a user and applying the setting values corresponding to the imaging scene selected by the user.

Due to this configuration, the user is able to perform image-capturing using the setting values appropriate for the imaging scene, with a simple operation. In addition, because the user makes a final determination on the imaging scene, this configuration contributes to generation of a clearer image.

A digital camera of a first modification (hereinafter, referred to as a "modified digital camera") differs from the digital camera 100 of the first embodiment in the function of the imaging scene judgment subunit 137. Accordingly, the explanation of the modified digital camera is given with a focus on the modified portion with respect to the digital camera 100.

Hereinafter, the imaging scene judgment subunit of this modified digital camera is referred to as a "modified scene judgment subunit".

<Operations>

The following explains operations of the modified digital camera.

<Imaging Scene Judgment Processing>

Figure 11:
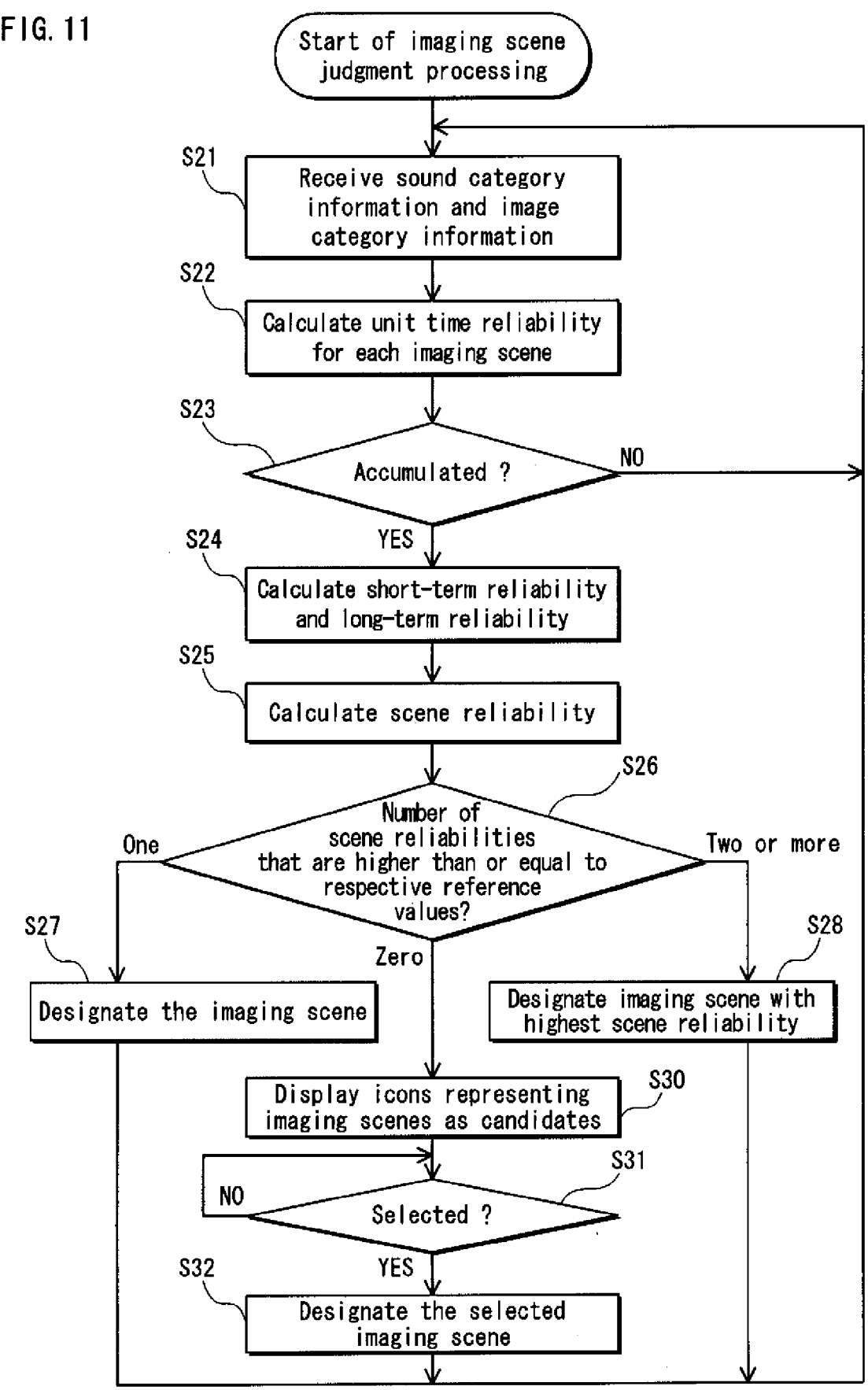
FIG. 11 is a flowchart showing imaging scene judgment processing performed by a modified scene judgment subunit.

FIG. 11 is a flowchart showing imaging scene judgment processing performed by the modified scene judgment subunit.

Because processing in steps S21 to S28 in FIG. 11 are the same as the processing by the imaging scene judgment subunit 137 of the first embodiment (see FIG. 9), processing in steps S30 to S32 is explained in the following.

In step S26, when the number of the scene reliabilities higher than or equal to the respective reference values is zero (step S26: "Zero"), the modified scene judgment subunit displays icons that respectively represent the imaging scenes whose scene reliabilities are higher than 0 as candidates on the display 6, from left to right in the descending order of the scene reliabilities (step S30).

The modified scene judgment subunit judges whether an operation of selecting any one of the candidate imaging scenes has been performed, via the operation panel 8 (step S31). When the selecting operation has not been performed (step S31: NO), the modified scene judgment subunit performs the processing of step S31 again. When the selecting operation has been performed (step S31: YES), the modified scene judgment subunit designates the selected imaging scene (step S32), transmits the scene identifier of the designated imaging scene to the setting unit 120, and performs the processing from step S21 again.

Having received the scene identifier, as is explained in steps S27 and S28, the setting unit 120 transmits the setting values acquired from the setting table 30 to the control devices and image processing unit 141 which then perform processing according to the received setting values.

Specific Example

The following explains processing from step S26 of FIG. 11 onward, using a specific example.

By way of example, FIG. 12 shows a reference value, and short-term reliability, long-term reliability, and scene reliability calculated by the modified scene judgment subunit, for each imaging scene.

Figure 13:
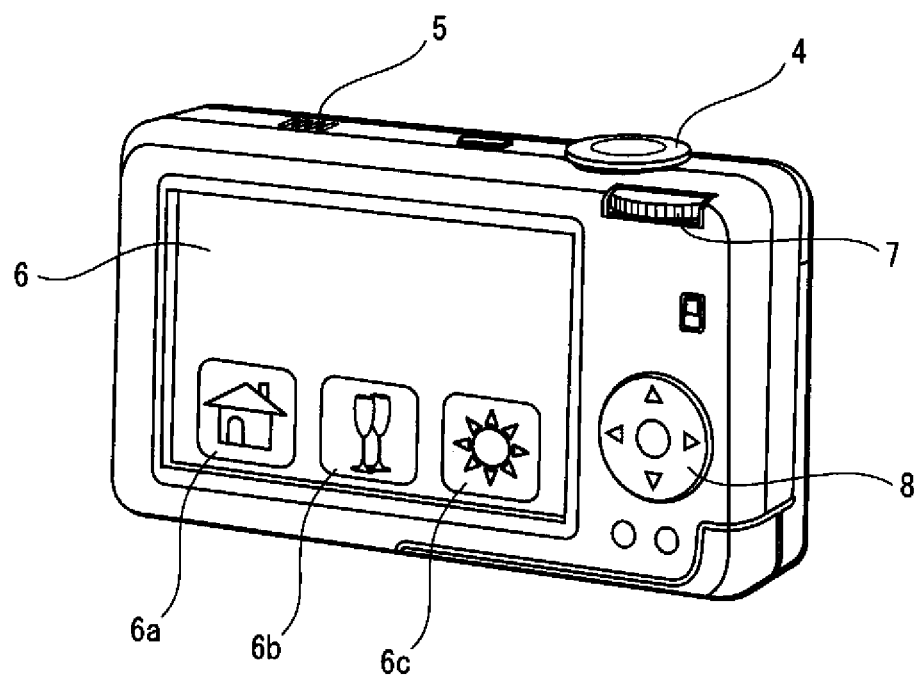
FIG. 13 shows an example display of icons representing imaging scenes as candidates.

FIG. 13 shows an example display of icons representing imaging scenes as candidates.

In the example shown in FIG. 12, there is no imaging scene related to scene reliability higher than or equal to the corresponding reference value, among all the scene reliabilities 52 (step S26: "Zero" in FIG. 11). Accordingly, the modified scene judgment subunit displays icons that respectively represent the imaging scenes "general indoor", "outdoor party", and "general outdoor", whose scene reliabilities are higher than zero, as candidates on the display 6, from left to right in the descending order of the scene reliabilities (step S30).

In this example, as shown in FIG. 13, an icon 6a representing the candidate imaging scene "general indoor", an icon 6b representing the candidate imaging scene "indoor party", and an icon 6c representing the candidate imaging scene "general outdoor" are displayed from left to right in the descending order of the scene reliabilities.

In this case, if, for example, the user selects the imaging scene "general indoor" by operating the operation panel 8 (step S31: YES), the modified scene judgment subunit designates the imaging scene as "general indoor", and transmits the scene identifier (S001) for "general indoor" to the setting unit 120.

After that, as is explained in the first embodiment, the setting unit 120 transmits the setting values acquired from the setting table 30 to the corresponding control devices and image processing unit 141, which then perform processing according to the received setting values.

<Second Modification>

In the first embodiment, the explanation has been given on a method of determining an imaging scene based on the ambient sound and automatically setting the setting values used for controlling the imaging mechanism that are appropriate for the determined imaging scene. The following explains, in addition to this, a modification example of identifying a detection target (human face, artificial object, etc.) based on the ambient sound, and when being able to detect the identified detection target from image data, automatically setting corrected setting values for controlling the imaging mechanism.

Note that in the following, an explanation is given with a focus on modified portions with respect to the digital camera 100 of the first embodiment.

<Functional Structure>

First, a functional structure of a digital camera 200 pertaining to a second modification is explained.

Figure 14:
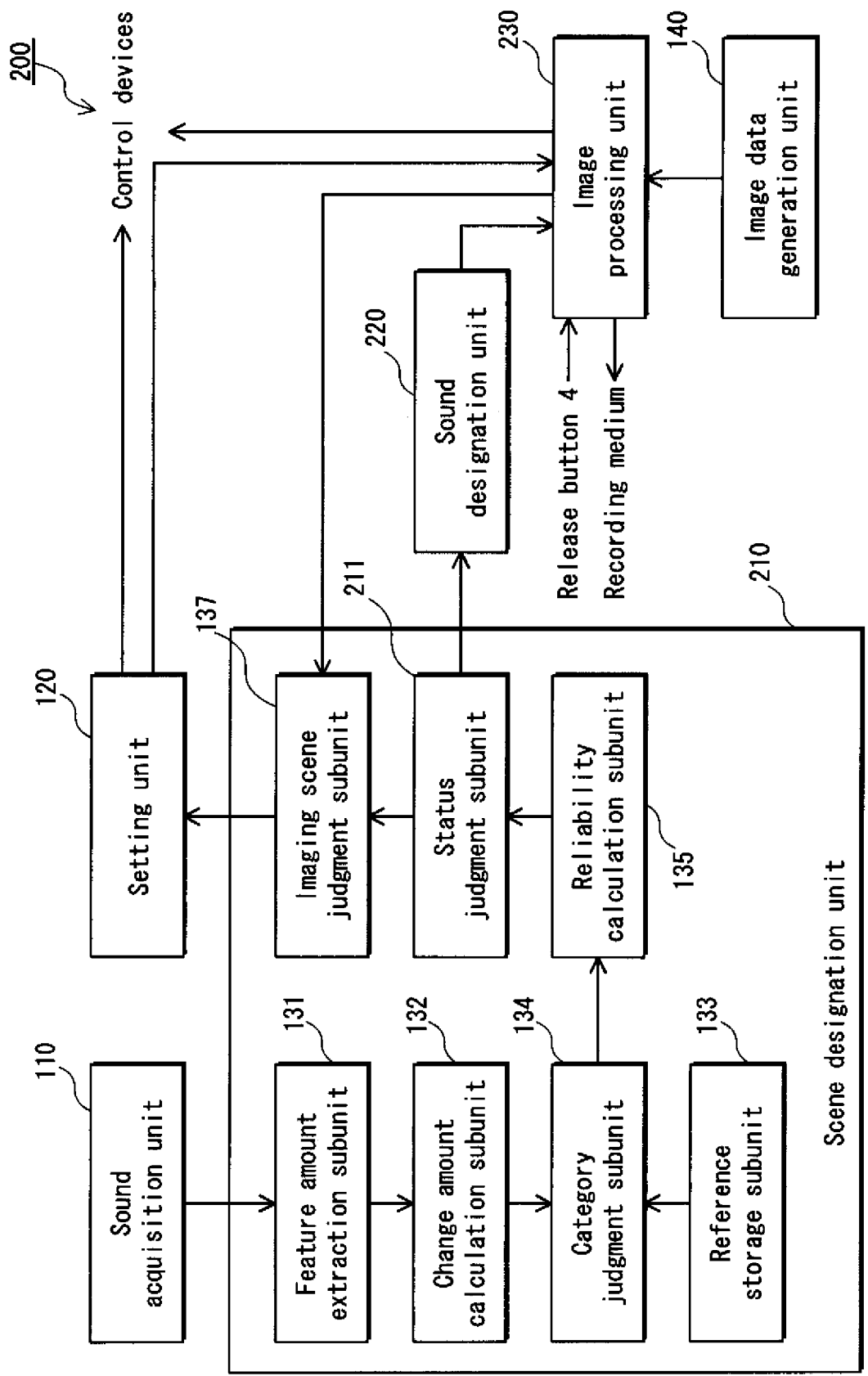
FIG. 14 is a block diagram showing a functional structure of main units of a digital camera 200.

FIG. 14 is a block diagram showing a functional structure of main units of the digital camera 200.

As shown in FIG. 14, the digital camera 200 includes a scene designation unit 210 and an image processing unit 230 instead of the scene designation unit 130 and the image processing unit 141 of the digital camera 100 of the first embodiment, and further includes a sound designation unit 220.

Here, the scene designation unit 210 differs from the scene designation unit 130 of the first embodiment in including a status judgment subunit 211 instead of the status judgment subunit 136 of the scene designation unit 130.

Note that in this modification, the sound categories include "human voice", "animal call", "train", "wind", etc. (hereinafter, also referred to as "new sound categories"), the reference storage subunit 133 retains a model information piece corresponding to each of the new sound categories, and a value corresponding to each of the new sound categories is registered in each table explained in the first embodiment.

Additionally, once the imaging scene judgment subunit 137 designates an imaging scene and transmits the scene identifier of the designated imaging scene to the setting unit 120, the imaging scene judgment subunit 137 does not transmit a scene identifier of the next imaging scene to the setting unit 120 upon designating the next imaging scene unless the next imaging scene is different from the previously designated imaging scene. This is because, as described later, there is a possibility that the image processing unit 230 has transmitted setting values corrected for optimization to control devices, and the control devices and the image processing unit 230 have performed processing based on the corrected setting values.

The status judgment subunit 211 has functions similar to the status judgment subunit 136 of the first embodiment, but differs from the status judgment subunit 136 in transmitting sound category information not only to the imaging scene judgment subunit 137 but also to the sound designation unit 220.

The sound designation unit 220 designates one sound category from among the sound categories (e.g. indoor, outdoor, human voice, animal call, train, wind, etc.) based on the sound category information received from the status judgment subunit 211 and sound category information obtained in the past, and transmits the sound category identifier of the designated sound category to the image processing unit 230.

In addition to the function of the image processing unit 141 of the first embodiment, the image processing unit 230 has the function of executing processing that are pre-associated with the designated sound category indicated by the sound category identifier received from the sound designation unit 220 (hereinafter, referred to as "associated processing").

Here, examples of the associated processing include object detection processing for detecting a human face, an animal body, an artificial object (e.g., a desk and a chair) and architecture (e.g., a building), motion detection processing, and blur correction processing.

<Operations>

The following explains operations of the digital camera 200.

<Sound Category Designation Processing>

Figure 15:
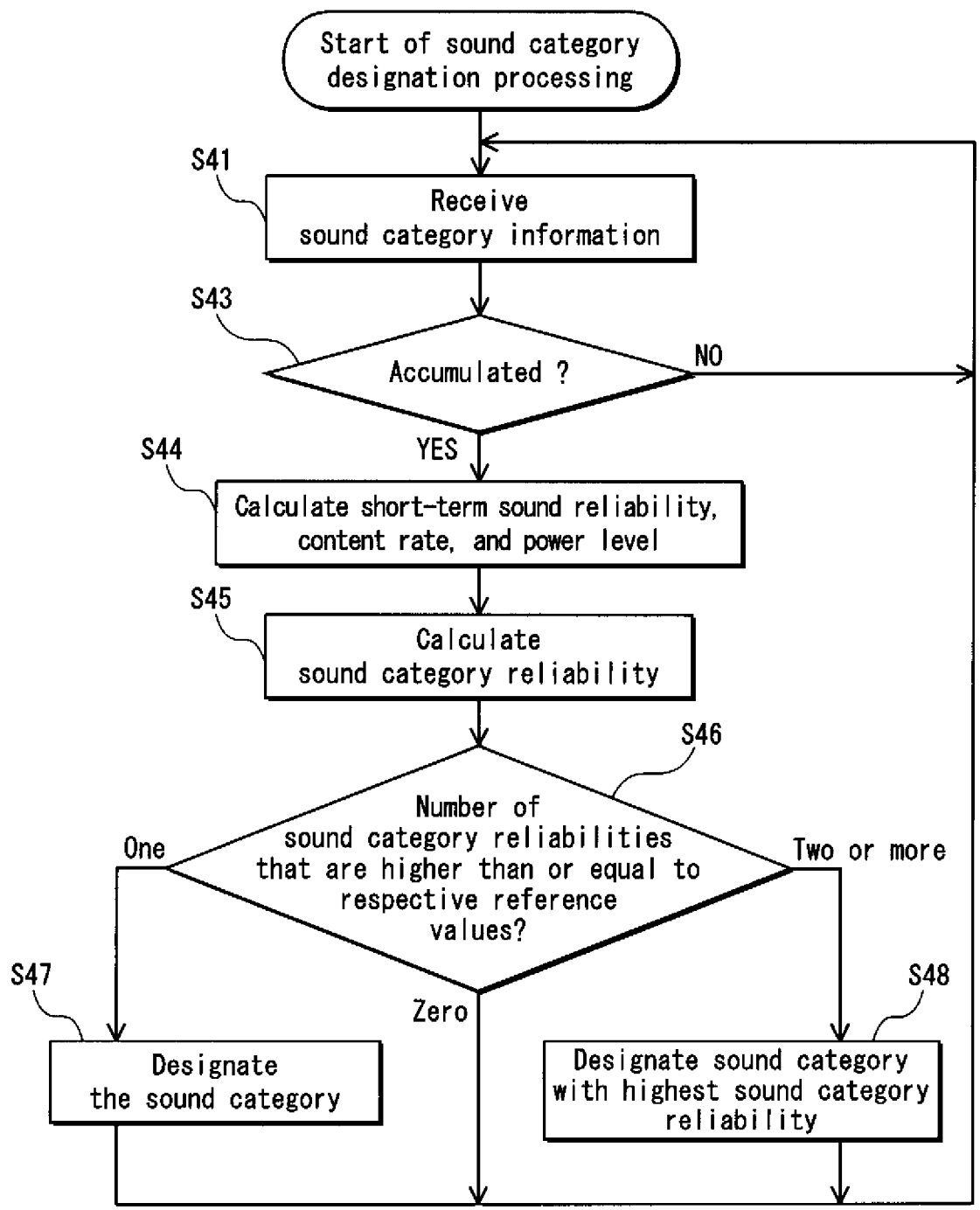
FIG. 15 is a flowchart showing sound category designation processing performed by a scene designation unit 220.

FIG. 15 is a flowchart showing sound category designation processing performed by the sound designation unit 220.

As shown in FIG. 15, upon receiving sound category information from the status judgment subunit 211 (step S41), the sound designation unit 220 accumulates the received sound category information and judges whether pieces of sound category information have been accumulated respectively for the sound data Dn−1 to Dn−4 that each have the unit duration and were processed one data piece to four data pieces immediately prior to the target data Dn (step S43).

When the pieces of sound category information have not been accumulated (step S43: NO), the sound designation unit 220 performs the processing from step S41 again. When the pieces of sound category information have been accumulated (step S43: YES), the sound designation unit 220 calculates, for each sound category, short-term sound reliability, a content rate, and a power level based on the pieces of sound category information respectively corresponding to the sound data Dn to Dn−4 (step S44).

Here, the short-term sound reliability for a sound category is an average value of the relative reliabilities for that sound category, which are included in the pieces of sound category information respectively corresponding to the sound data Dn and Dn−1.

The content rate for a sound category is a ratio of the number of relative reliabilities that are higher than zero to the total number of relative reliabilities for that sound category included in the pieces of sound category information respectively corresponding to the sound data Dn to Dn−4. For example, assume a case where the relative reliabilities for the sound category "human voice" included in the pieces of sound category information respectively corresponding to the sound data Dn to Dn−4 are "0.5", "0.4", "0.3", "0.2", and "0". In this case, the number of relative reliabilities that are higher than "0" is four, and the content rate can be calculated as "0.8".

The power level for a sound category is an average value of the powers of sound of portions of the sound data Dn to Dn−4 where relative reliabilities for that sound category that are higher than 0 are included (a value normalized to take on a value in a range of 0 to 1). Note that although an explanation has not been particularly given, the sound designation unit 220 is assumed to receive feature amounts related to the power of sound from the category judgment subunit 134 in order to calculate a power level for each sound category.

For each sound category, the sound designation unit 220 calculates an average value of the short-term sound reliability, the content rate, and the power level calculated for the sound category (hereinafter, referred to as "sound category reliability") (step S45).

The sound designation unit 220 judges whether the sound category reliability calculated for each sound category is higher than or equal to a reference value pre-defined for the sound category, and determines the number of sound category reliabilities that are higher than or equal to the respective reference values (step S46).

When the number of the sound category reliabilities that are higher than or equal to the respective reference values is zero (step S46: "Zero"), no processing is performed in particular, and the sound designation unit 220 performs the processing from step S41 again. When the number of the sound category reliabilities that are higher than or equal to the respective reference values is one (step S46: "One"), the sound designation unit 220 designates the sound category pertaining to the sound category reliability that is higher than or equal to the corresponding reference value (step S47), and transmits the sound category identifier of the designated sound category to the setting unit 230, and performs the processing from step S41 again.

Having received the sound category identifier, the image processing unit 230 executes associated processing corresponding to the sound category indicated by the received sound category identifier. For example, when the sound designation unit 220 designates the sound category "human voice", the image processing unit 230 (i) performs, as the associated processing, processing for detecting a human face, and (ii) upon detection, for example, transmits a setting value for focusing on the detected face portion and the like to the corresponding control devices, and changes content of image processing to be performed on the captured image to, for example, emphasize a skin color.

Note that the image processing unit 230 retains template images for face detection, and detects a face by performing matching processing between the template images and the image data received from the image data generation unit 140.

When the number of the sound category reliabilities that are higher than or equal to the respective reference values is two or more (step S46: "Two or more"), the sound designation unit 220 (i) designates the sound category pertaining to the highest sound category reliability (step S48), (ii) transmits the sound category identifier of the designated sound category to the image processing unit 230, as in step S47, and (iii) performs the processing from step S41 again. Upon receiving the sound category identifier, the image processing unit 230 executes the associated processing corresponding to the sound category indicated by the received sound category identifier.

Note that while the above explanation has been given on an example case where the image processing unit 230 performs face detection as associated processing when, as an example, the sound designation unit 220 designates the sound category "human voice". In a case where the sound designation unit 220 designates the sound category "indoor", however, the image processing unit 230 may (i) perform, as the associated processing, processing for detecting an artificial object (a desk, a chair, etc.) or processing for judging a fluorescent lamp color (warm color, cold color, etc.) based on brightness information and the like, (ii) transmit setting values for focusing etc. to the corresponding control devices based on the detection/judgment result, and (iii) change content of color correction processing performed on the captured image (e.g. a setting value for white balance).

Alternatively, for example, in a case where the sound designation unit 220 designates the sound category "outdoor", the image processing unit 230 may (i) perform, as the associated processing, processing for detecting a natural object such as a mountain or a large building, or motion detection, (ii) transmit setting values for focusing etc. to the corresponding control devices based on the detection result, and (iii) change content of color correction processing performed on the captured image (e.g., a setting value for an emphasized color).

Alternatively, for example, as shown in FIG. 16, the image processing unit 230 may (i) retain, for each sound category, a setting table 60 in which setting values are registered, the setting values including a setting value pertaining to a distance from the imaging object, such as a short distance range, a middle distance range, and a long distance range, (ii) transmit, to the corresponding control devices, setting values for controlling the imaging mechanism that are corrected for the designated sound category, and (iii) perform image processing according to the setting values (in this example, processing for adjusting the white balance).

Alternatively, for example, in a case where the sound designation unit 220 designates the sound category "wind", the image processing unit 230 may perform blur correction as the associated processing. Furthermore, in this case, modification may be made to judge how much wind is blowing based on the power level and the like. Here, with the effect of the wind taken in consideration, it is permissible to correct the blur of the digital camera 200 based on a blur correction amount calculated based on information provided by the sensor 3, and to detect the swaying of an object to be imaged such as a plant. This way, the swaying of the digital camera 200 and the swaying of the object to be imaged may be corrected simultaneously.

In a case where the sound designation unit 220 designates the sound category involving a vehicle such as a "train", the image processing unit 230 may perform blur correction as the associated processing. In this case, a degree of shaking of the vehicle may be judged based on the power level, etc., and the blur correction may be performed with the effect of the shaking taken into consideration.

Second Embodiment

In a second embodiment, an explanation is given on an example case where the captured image data is classified using the sound category information explained in the first embodiment, for use in search of image data.

<Functional Structure>

First, an explanation is given on a functional structure of a digital camera 300 of the second embodiment.

Figure 17:
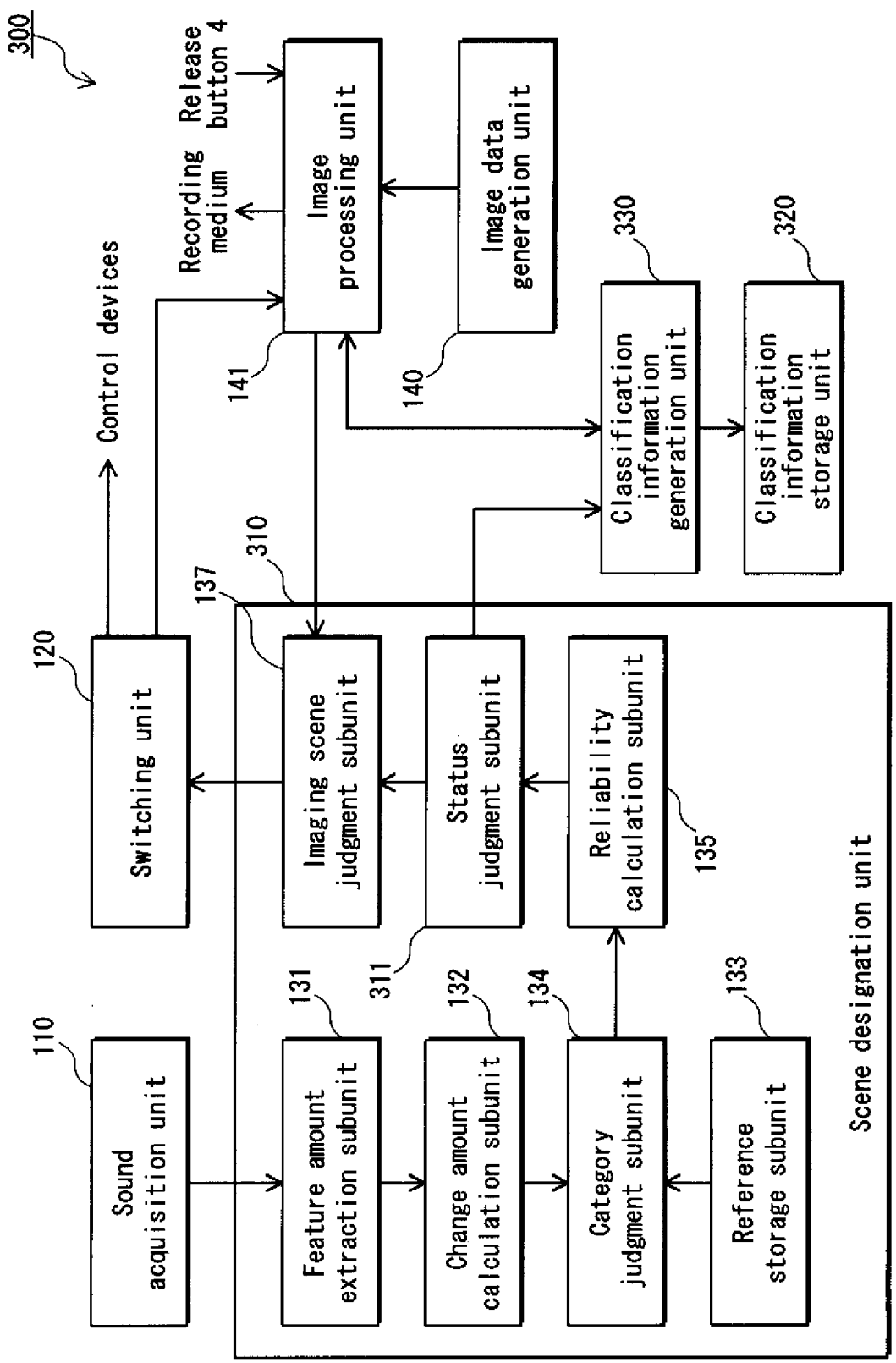
FIG. 17 is a block diagram showing a function structure of main units of a digital camera 300.

FIG. 17 is a block diagram showing a function structure of main units of the digital camera 300.

As shown in FIG. 17, the digital camera 300 includes a scene designation unit 310 instead of the scene designation unit 130 of the digital camera 100 of the first embodiment, and further includes a classification information storage unit 320 and a classification information generation unit 330.

Note that in the present embodiment, upon receiving from the release button 4 a notification indicating that an instruction for image-capturing has been given, the image processing unit 141 provides this notification to the classification information generation unit 330 accordingly.

Note that while the scene designation unit 310 differs from the scene designation unit 130 in including a status judgment subunit 311 instead of the status judgment subunit 136 of the scene designation unit 130 of the first embodiment, the status judgment subunit 311 has the same function as the status judgment subunit 136 of the first embodiment, except that the status judgment subunit 311 transmits the sound category information not only to the imaging scene judgment subunit 137 but also to the classification information generation unit 330.

The classification information storage unit 320 is a memory area for storing a category configuration table, a group table, and an important group table. Contents of these tables are described later (see FIGS. 18A, 18B and 18C).

The classification information generation unit 330 accumulates pieces of sound category information received from the status judgment unit 311 in the receiving order. When notified from the image processing unit 141 that the instruction for image-capturing has been given, the classification information generation unit 330 calculates, for each sound category, reliability of the sound category based on pieces of sound category information corresponding to a predetermined number (for example, ten) of pieces of sound data, each of which has the unit duration and which were consecutively input to the digital camera 300 (hereinafter, this reliability is referred to as "long-term sound reliability").

The classification information generation unit 330 registers the calculated long-term sound reliability for each sound category (hereinafter, referred to as "category configuration information") in the category configuration table 70, and registers the registered category configuration information in the group table 80 as a member of one of groups, based on the long-term sound reliability for each sound category constituting the category configuration information.

The classification information generation unit 330 also judges, for each group, whether the group is an important group, based on the number of members constituting the group, and registers the group in the important group table 90 in accordance with the judgment result. Note that the judgment method is described later (see FIG. 19).

<Data>
<Category Configuration Table>

FIG. 18A shows a data configuration and exemplary contents of the category configuration table 70.

The category configuration table 70 is a table in which, for each category configuration information, a piece of data associating a configuration identifier 71, a long-term sound reliability 72, and a registration date 73 with one another, and the registration is made by the classification information generation unit 330.

Here, each configuration identifier 71 is identification information for identifying corresponding category configuration information. In the example shown in FIG. 18A, the configuration identifiers are assigned sequential numbers starting from "1". Note that each configuration identifier is also associated with the corresponding captured image data and is used for making searches for image data.

The long-term sound reliability 72 is information indicating long-term sound reliabilities for the sound categories constituting the corresponding category configuration information. The registration date 73 is information indicating the time and date of registration of the corresponding category configuration information.

FIG. 18A shows that, for example, in a piece of category configuration information having an configuration identifier of "1", the long-term sound reliability for the sound category "indoor" is "0.5", the long-term sound reliability for the sound category "outdoor" is "0.3", the long-term sound reliability for the sound category "underwater" is "0.15", and the registration date is "2008/3/1 10:10".

<Group Table>

FIG. 18B shows a data configuration and exemplary contents of the group table 80.

The group table 80 is a table in which, for each group, a piece of data associating a group identifier 81 with a member identifier 82 is registered, and the registration is made by the classification information generation unit 330. Note that it is assumed that no piece of information constituted from associated group identifier and member identifier (so-called record) is not registered when the use of the digital camera 300 has just begun.

Each group identifier 81 here is identification information for identifying a corresponding group, and is assigned a different one of character strings. In the example case here, each group identifier is a character string composed of a combination of a letter "G" and a serial number starting from "1".

Each member identifier 82 is identification information for identifying category configuration information being a member of a corresponding group, and coincides with one of the configuration identifiers registered in the category configuration table 70.

FIG. 18B shows that, for example, a group with a group identifier of "G1" is composed of members with member identifiers of "1", "51", "100", . . . , respectively. In other words, the group with the group identifier of "G1" is composed of pieces of category configuration information registered in the category configuration table 70 with the configuration identifiers of "1", "51", "100", . . . , respectively.

<Important Group Table>

FIG. 18C shows a data configuration and exemplary contents of the important group table 90.

The important group table 90 is a table in which, for each important group, a piece of data associating an important group identifier 91 and a member group identifier 92 is registered by the classification information generation unit 330.

Here, each important group identifier 91 is identification information for identifying a corresponding important group, and is assigned a different one of character strings.

Each member group identifier 92 is identification information for identifying a group which constitutes a corresponding important group, and matches one of the group identifies in the group table 80. Note that it is assumed that no group identifier is registered in the member group identifier 92 when the use of the digital camera 300 has just begun.

FIG. 18C shows that, for example, a group with an important group identifier of "IG1" is composed of members having member group identifiers of "G1", "G3", and "G6", respectively, i.e. composed of groups registered in the group table 80 with the group identifiers of "G1", "G3", and "G6", respectively.

Note that a difference between an important group with the important group identifier of "IG1" and an important group with the important group identifier of "IG2" is described later (see FIG. 19).

<Operations>

The following explains operations of the digital camera 300.

<Classification Information Generation Processing>

Figure 19:
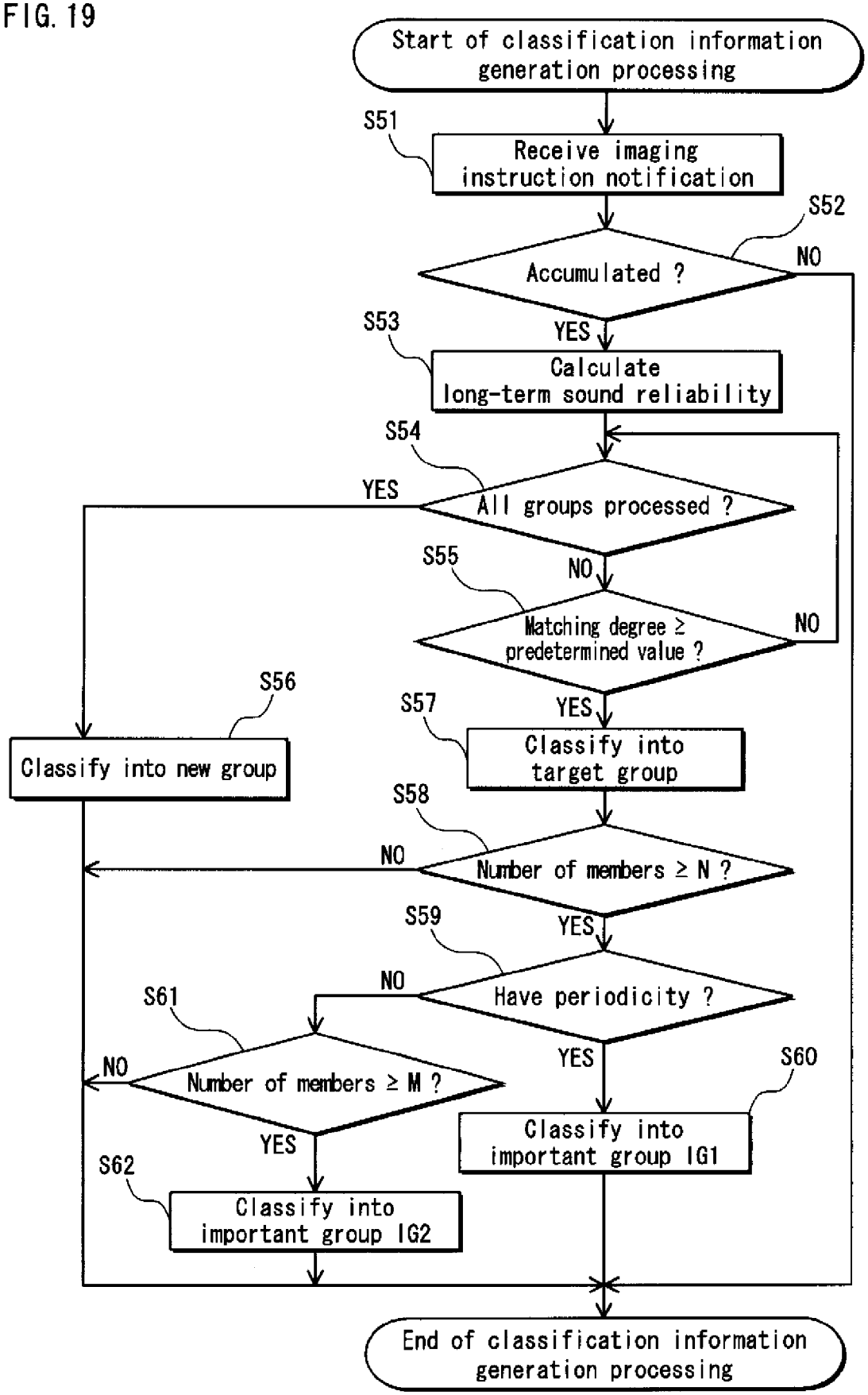
FIG. 19 is a flowchart showing classification information generation processing performed by a classification information generation unit 330.

FIG. 19 is a flowchart showing classification information generation processing performed by the classification information generation unit 330.

Note that it is assumed that upon receiving sound category information from the status judgment subunit 311, the classification information generation unit 330 accumulates the received sound category information in the receiving order, in addition to performing this classification information generation processing.

As shown in FIG. 19, upon receiving from the image processing unit 141 a notification indicating that an instruction for image capturing has been given (step S51), the classification information generation unit 330 judges whether the following have been accumulated: (i) the sound category information that has been accumulated most recently; and (ii) the pieces of sound category information for sound data Dn–1 to Dn–9, each of which has the unit duration and which were processed one to nine pieces immediately prior to the sound data Dn, which has the unit duration and pertains to the sound category of the most recently accumulated sound category information (step S52).

When these pieces of sound category information have not been accumulated (step S52: NO), the classification information generation unit 330 terminates the classification information generation processing. When these pieces of sound category information have been accumulated (step S52: YES), the classification information generation unit 330 calculates long-term sound reliability for each sound category based on the pieces of sound category information for the sound data Dn to Dn–9 (step S53).

Here, the long-term sound reliability for each sound category is an average value of relative reliabilities for the sound category included in the pieces of sound category information for the sound data Dn to Dn–9.

The classification information generation unit 330 registers a piece of category configuration information constituted from a configuration identifier, the calculated long-term sound reliabilities for the sound categories, and a registration date, into the category configuration table 70 of the classification information storage unit 320. Note that the configuration identifier is a value obtained by adding one to the largest configuration identifier among the configuration identifiers already registered in the category configuration table 70, and the registration date is obtained using values acquired from a time measurement unit (not shown) as needed (for example, values representing time every one minute).

Next, the classification information generation unit 330 judges whether or not processing in step S55 explained below has been completed for all the groups indicated by the group identifiers registered in the group table 80 (step S54).

When the processing has not been completed for all the groups (step S54: NO), the classification information generation unit 330 acquires the smallest identifier from the member identifiers in one group for which the processing has not been completed (hereinafter, referred to as "target group") in the group table 80, and acquires from the category configuration table 70 the long-term sound reliabilities of the category configuration information indicated by the acquired identifier. The classification information generation unit 330 then calculates a matching degree between the acquired long-term sound reliabilities for the sound categories and the long-term sound reliabilities for the sound categories calculated in step S53, and judges whether the calculated matching degree is higher than or equal to a predetermined value (e.g. 0.9) (step S55).

Here, for example, when the long-term sound reliabilities for the sound categories "indoor", "outdoor", "underwater", . . . , acquired from the category configuration table 70 are "Lra1", "Lrb1", "Lrc1", . . . , and the long-term sound reliabilities for the sound categories "indoor", "outdoor", "underwater", . . . , calculated in step S53 are "Lra2", "Lrb2", "Lrc2", . . . , the matching degree can be calculated as below.

$$C = 1 - \frac{}{\sqrt{(Lra1 - Lra2)^2 + (Lrb1 - Lrb2)^2 + (Lrc1 - Lrc2)^2 + \ldots}}$$ [Equation 2]

When the matching degree is less than the predetermined value (step S55: NO), the classification information generation unit 330 performs the processing from step S54 again. When the processing has been completed for all the groups (step S54: YES), the classification information generation unit 330 classifies the piece of category configuration information related to the long-term sound reliabilities calculated for the sound categories in step S53 into a new group (step S56). That is, the classification information generation unit 330 registers a record composed of the configuration identifier included in this category configuration information and a newly generated group identifier into the group table 80 and terminates the classification information generation processing.

On the other hand, when the calculated matching degree is higher than or equal to the predetermined value (step S55: YES), the classification information generation unit 330 classifies the piece of category configuration information related to the long-term sound reliabilities calculated for the sound categories in step S53 into the target group (step S57). That is, the classification information generation unit 330 adds the configuration identifier included in this category configuration information to the member identifiers of the target group of the group table 80.

Next, the classification information generation unit 330 judges whether the number of member identifiers of the target group is N (for example, 10) or more (step S58). When the number of the member identifiers of the target group is less than N (step S58: NO), the classification information generation unit 330 terminates the classification information generation processing. When the number of the member identifiers of the target group is N or more (step S58: YES), the classification information generation unit 330 judges whether the registration dates of the pieces of category configuration information being the members of the target group have a periodicity (step S59).

The periodicity here refers to that the pieces of category configuration information being the members of the target group are registered periodically, such as once a day, once a week, or once a month.

The judgment on the presence of the periodicity can be made using a general method of frequency analysis, and accordingly, a detailed explanation thereof is omitted here.

When judging that the registration dates have periodicity (step S59: YES), the classification information generation unit 330 classifies the target group into the important group with the important group identifier of "IG1" (step S60), and terminates the classification information generation processing. In other words, the classification information generation unit 330 adds the group identifier of the target group to the member group identifiers corresponding to the important group identifier of "IG1" in the important group table 90.

That is, a group composed of N or more pieces of category configuration information as its the members and whose registration dates have periodicity belongs to the important group with the important group identifier of "IG1".

When the number of the pieces of category configuration information of the target group is N or more and the registration dates thereof have periodicity, it indicates that there have been periodical image-capturing performances which can be judged, based on the sound, to have taken place in a common environment. Thus, this target group can be presumed to be a group related to an important event for the user.

On the other hand, when judging that the registration dates do not have periodicity (step S59: NO), the classification information generation unit 330 judges whether or not the number of member identifiers of the target group is M or more (for example, 50), M being larger than N (step S61).

When the number of the member identifiers of the target group is less than M (step S61: NO), the classification information generation unit 330 terminates the classification information generation processing. When the number of the member identifiers of the target is M or more (step S61: YES), the classification information generation unit 330 classifies the target group into an important group with an important group identifier of "IG2" (step S62), and terminates the classification information generation processing. In other words, the classification information generation unit 330 adds the group identifier of the target group to the member group identifiers corresponding to the important group identifier of "IG2" in the important group table 90.

That is, a group composed of M or more pieces of category configuration information as its members and whose registration dates do not have periodicity belongs to the important group with the important group identifier of "IG2".

When the registration dates pertaining to the target group do not have periodicity and the number of the pieces of category configuration information of the target group is M or more, it indicates that there have been frequent image-capturing performances which can be judged, based on the sound, to have taken place in a common environment. Thus, this target group can be presumed to be a group related to an important event for the user.

Search Example

The following explains how a search is conduced using information pieces generated and registered in the tables via the above-described classification information generation processing, by use of a specific example.

Figure 20A:
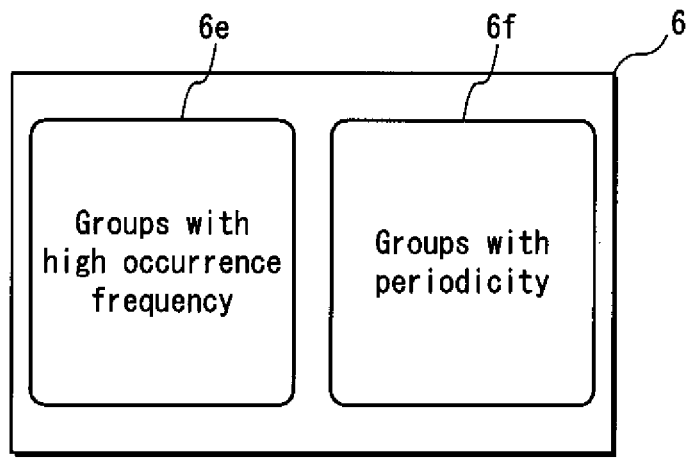
FIGS. 20A, 20B and 20C each show screen transition of a display 6 of the digital camera 300.
Figure 20B:
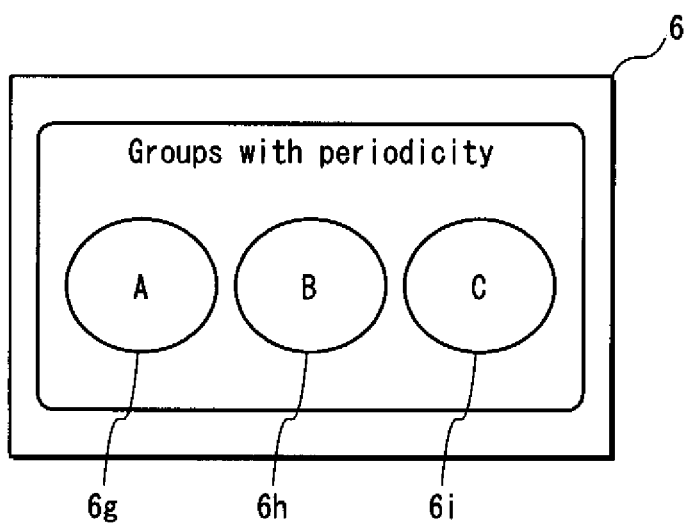
Figure 20C:
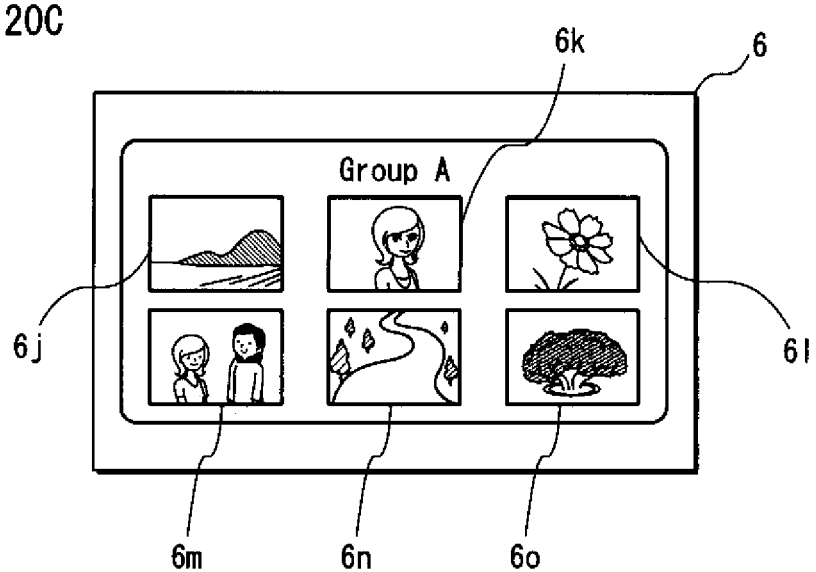

FIGS. 20A, 20B and 20C each show screen transition of the display 6 of the digital camera 300.

Note that for simplification of the explanation, FIGS. 20A, 20B and 20C each show only the display 6 of the digital camera 300, and omits the illustration of the casing and the like of the digital camera 300.

FIG. 20A shows a display example of a screen for selecting one of the important groups registered in the important group table 90 (hereinafter, this screen is referred to as an "important group selection screen").

The important group selection screen shows an icon 6e displaying the sentence "groups with high occurrence frequency" and an icon 6f displaying the sentence "groups with periodicity".

Assume that the user operates the operation panel 8 for the important group selection screen and selects, for example, the icon 6f. The digital camera 300 then acquires the member group identifiers "G1", "G3", and "G6" of the important group registered in the important group table 90 in correspondence with the important group identifier of "IG1", and displays the screen shown in FIG. 20B (hereinafter, referred to as a "group selection screen") on the display 6.

Note that, although not particularly shown, if the user selects the icon 6e by operating the operation panel 8, the digital camera 300 displays, on the display 6, a selection screen (similar to the screen of FIG. 20B) for the groups registered in the important group table 90 in correspondence with an important group identifier of "IG2".

The group selection screen displays icons 6g, 6h, and 6i, the number of which corresponds to the number "3" of the acquired member group identifiers, and the example of group selection screen indicates that "group with periodicity" includes three groups.

Note that the example of this group selection screen is presented under the assumption that alphabets from "A" to "Z" are used as characters displayed for icons, in accordance with the number of the member group identifiers.

In this group selection screen, if the user selects, for example, the icon 6g by operating the operation panel 8, the digital camera 300 acquires member identifiers "1", "51", "100", . . . registered in the group table 80 in correspondence with the group identifier of "G1", and displays a screen of FIG. 20C (hereinafter, referred to as "thumbnail screen") on the display 6.

The thumbnail screen displays thumbnail images 6j to 6o of pieces of image data associated with the acquired member identifiers (configuration identifiers).

Although not shown, in a case where the user selects one of the thumbnail images on the thumbnail screen by operating the operation panel 8, the corresponding image data piece is displayed on the entirety of the display 6.

<Additional Remarks>

Although the imaging device pertaining to the present invention has been described above based on the first embodiment, the first modification, the second modification and the second embodiment (hereinafter, these are also simply referred to as "embodiments"), it goes without saying that it is possible to modify the imaging device in the following manners, and the present invention is not limited to the imaging device as described in the above-described embodiments.

(1) Information pieces indicating the imaging scenes designated according to the methods explained in the first embodiment and the second modification may be associated with image data pieces in order to allow the information pieces indicating the imaging scenes to be used for a search of the image data pieces.

For example, the following configuration may be adapted. Icons respectively indicating a plurality of imaging scenes are displayed on the display 6, and when the user selects one of the icons by operating the operation panel 8, thumbnail images of image data pieces associated with the information pieces of the selected imaging scene are displayed.

Figure 21:
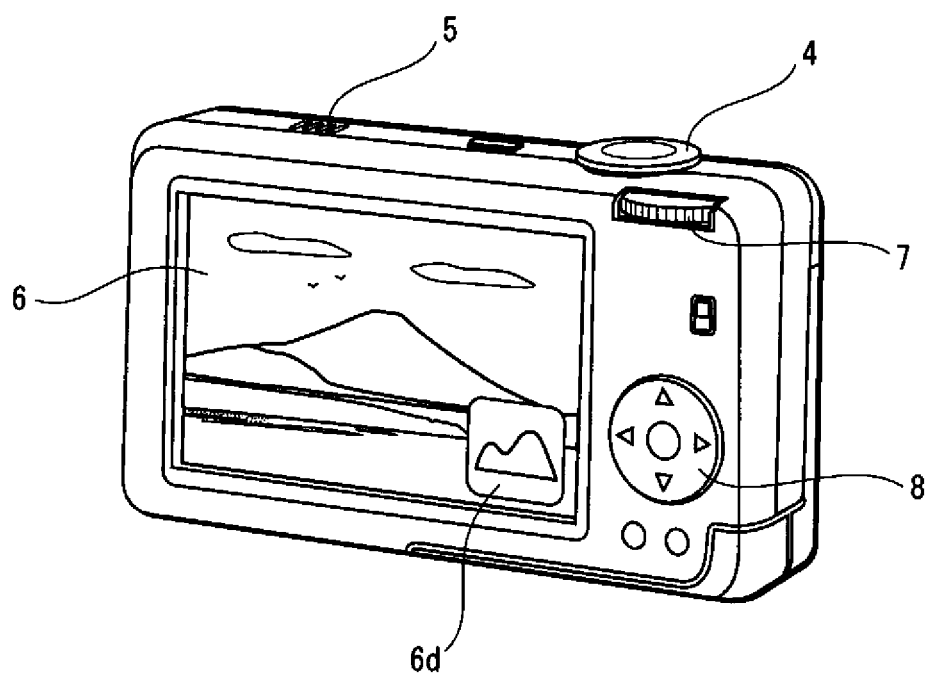
FIG. 21 shows an example display of an icon 6d representing an imaging scene for the display 6.

When the user selects one of the thumbnail images by operating the operation panel 8, an image corresponding to the selected thumbnail image (an image of the outdoor scenery in the example of FIG. 21) is displayed on the display 6. FIG. 21 also shows an example case where the icon 6*d* indicating the corresponding imaging scene (the icon indicating the imaging scene "general outdoor" in this example) is displayed superimposed on the displayed image.

Additionally, as explained in the second modification, when designating an imaging scene selected by the user from among a plurality of candidate imaging scenes, information pieces indicating other candidate imaging scenes that have not been selected may be associated with the corresponding image data pieces so as to allow searching for these corresponding image data pieces using the information pieces indicating the other candidate imaging scenes, or so as to allow searching for image data pieces that are commonly associated with a plurality of candidate imaging scenes.

(2) It has been described in the embodiments that, for each of the pre-defined sound categories such as indoor, outdoor and underwater (referred to as "integrated categories" in this section), there is a model information piece composed of feature amounts that are to be classified into the sound category. However, alternatively, there may be a model information piece for each of segmentalized sound categories such as indoor 1, indoor 2, indoor 3, outdoor 1, outdoor 2, underwater 1, underwater 2, and underwater 3 (referred to as "segmentalized categories" in this section).

For example, when likelihoods for the segmentalized categories "indoor 1", "indoor 2", and "indoor 3" are "La1", "La2", and "La3", respectively, a likelihood a for an integrated category "indoor" can be calculated by "Wa1×La1+Wa2×La2+Wa3×La3".

Here, each of Wa1, Wa2, and Wa3 is a coefficient. They are determined so as to add up to a total of 1. Likelihoods of other integrated categories can be determined in a similar manner.

(3) According to the explanation on the first embodiment and the first modification, the imaging scene is designated according to the scene reliabilities calculated based on the sound category information and the image category information. However, the imaging scene may be designated based on the scene reliabilities calculated based only on the sound category information.

Also, although each scene reliability has been explained as calculated based on the corresponding short-term reliability and long-term reliability, one of the corresponding short-term reliability and the long-term reliability may be specified as the scene reliability.

Additionally, although each scene reliability has been explained as an average value of the corresponding short-term reliability and the long-term reliability, the scene reliability may be calculated by weighing the corresponding short-term reliability and long-term reliability.

Although according to the explanation above, each short-term reliability is calculated based on two unit time reliabilities (i.e. two seconds), and each long-term reliability is calculated based on five unit time reliabilities (i.e. five seconds), these numbers being two and five may be greater or smaller. The numbers, however, need to be determined such that the long-term reliability has a larger number of unit time reliabilities used for calculation than the short-term reliability.

(4) The second modification has been explained assuming that the control devices and the image processing unit 230 operate in accordance with the setting values appropriate for the designated imaging scene. For example, an explanation has been given on a case where the sound category "human voice" is designated. In this case, because presumably there is a human being in the surrounding, processing for detecting a human face is performed, and upon detection the control devices and the image processing unit 230 are caused to operate in accordance with the setting values for focus, color emphasis, etc, which have been corrected to be more appropriate.

However, it is not necessary to assume that the control devices and the image processing unit 230 operate in accordance with the setting values appropriate for the imaging scene, and the control devices and the image processing unit 230 may operate only in accordance with the setting values corresponding to the designated sound category.

In this case, the setting table 60 shown in FIG. 16 may further include, as the items constituting the field of setting values, "focus", "shutter speed", "color emphasis", "flash", etc., which are the items included in the field of setting values in the setting table 30 shown in FIG. 6.

(5) According to the explanation on the second modification, the sound designation unit 220 designates one sound category based on the relative reliabilities for the sound categories constituting the sound category information. However, the one sound category may be designated based on likelihoods of the sound categories.

(6) According to the explanation on the first embodiment, when one of the change amounts calculated in step S3 of FIG. 7 is greater than the corresponding threshold value, a negative judgment is made (step S3: NO). However, a negative judgment may be made only when all of the calculated change amounts are greater than the respective threshold values, or only when a change amount for a specific feature is greater than a corresponding threshold value.

(7) According to the explanation on step S26 of FIG. 9 of the first embodiment and FIG. 11 of the first modification, a fixed reference value (hereinafter, referred to as a "first reference value") is used. However, the following configuration may be adapted instead. When the number of scene reliabilities that are higher than or equal to the first reference value is less than a predetermined number, a second reference value which is set to be lower than the first reference value is used, and when the number of scene reliabilities that are higher than or equal to the first reference value is the predetermined number or more, a third reference number which is set to be higher than the first reference value is used.

Also, when the number of scene reliabilities that are higher than or equal to the reference value is zero in step S26 (step S26: "Zero"), the imaging scene pertaining to the highest scene reliability may be designated.

(8) According to the explanation on step S28 of FIG. 9 of the first embodiment and FIG. 11 of the first modification, the imaging scene pertaining to the highest scene reliability of all the scene reliabilities higher than or equal to the respective reference values is selected. However, an imaging scene may be designated according to another reference. For example, it is permissible to designate the imaging scene whose scene reliability has the largest difference from the corresponding reference value of all the scene reliabilities higher than or equal to the respective reference values.

(9) The processing pertaining to the first modification (see FIG. 11) has been described to be executed when the dial button 7 shown in FIG. 1B is set to the automatic optimization mode. The processing, however, may be executed when the dial button 7 is set to a specific mode other than the automatic optimization mode.

According to the explanation on FIG. 11, processing of steps S30 to S32 is performed only when the number of scene reliabilities that are higher than or equal to the respective reference values is zero (step S26: "Zero") in step S26. However, the processing of steps S30 to S32 may be performed independent of the number of scene reliabilities that are higher than or equal to the respective reference values. That is, the processing of steps S30 to S32 may be performed upon completion of the processing of step S25.

(10) In the embodiments above, a selection operation by the user is performed via the operation panel 8. However, the display 6 may be a touchscreen and the user may perform the operation via the touchscreen.

(11) According to the explanation on the second modification, for example, face detection is performed when the sound category "human voice" is designated. However, the following configuration may be adapted instead. Ordinary face detection processing (in this section, referred to as "first face detection processing") is performed regardless of the designated sound category, and when the sound category "human voice" is designated, face detection processing which includes processing different from the above-mentioned ordinary face detection processing (in this section, referred to as "second face detection processing") is performed.

As the second face detection processing, for example, processing for detecting not only a frontal face but also a profile may be performed, or since it is presumed that a human being is present, face detection processing may be performed with a threshold value used for detecting a frontal face reduced. Note that the detection of a profile obviously requires corresponding template images.

Note that while the explanation here is given on the face detection as an example, processing for detecting other objects can be similarly modified, and furthermore, processing other than the detection processing can also be modified to finely adjust the accuracy and contents of the processing.

(12) According to the explanation on the first modification, as shown in FIG. 13, the icons representing the candidate imaging scenes are displayed on the display 6 from left to right in the descending order of the scene reliabilities. However, the display order of the icons is not limited to this. For example, the icons may be displayed from right to left, from top to bottom, or from bottom to top, in the descending order of the scene reliabilities. Alternatively, a list format may be employed instead of displaying the icons, the list format listing character strings representing the candidate imaging scenes. In the icon display or list display, the size of the displayed icons or characters may be adjusted according to how high the scene reliabilities are.

(13) The change amount calculation subunit 132 of the embodiments have been explained as calculating differences of the feature amounts of the successively input pieces of sound data that each have the unit duration. However, the present invention is not limited to this configuration. For example, a difference of data pieces input within a predetermined time period, variance, or a regression coefficient may be calculated instead.

Here, the difference of data pieces input within the predetermined time period includes an inter-frame difference in a case where the minimum data unit is a frame, and may be a difference from a data piece which precedes a reference time by two frames, or a flux which is an average of all of differences of data pieces which precede the reference time by one to n frames.

The variance here is a calculation result defined as general sample variance or unbiased variance for the data pieces input within the predetermined time period.

The regression coefficient is a model coefficient calculated using a regression analysis method such as a least-square method or a logistic regression method, and how much the model varies is determined based on the model coefficient.

(14) According to the explanation on the status judgment subunit in the embodiments, whether the designated one or more sound categories change drastically is judged based on whether, when designating one or more sound categories, at least a portion of the designated sound categories overlaps with one or more sound categories designated for the sound data Dn−1 and the sound data Dn−2, respectively, each of which has the unit duration and which were processed one data piece and two data pieces immediately prior to the target data Dn, respectively.

However, a method for judging whether the designated one or more sound categories change drastically is not limited this. For example, the change rate and the overlapping degree of the designated one or more sound categories may be used for the judgment.

Here, the change rate of the designated one or more sound categories may be calculated as, for example, M/T, where M denotes the number of category changes within data of T seconds. The overlapping degree of the designated one or more sound categories is calculated as an average value for, for example, T seconds when the number of categories with a high likelihood judged for each second is C1.

(15) It is preferable that during the image capturing, the speaker microphone 5 shown in FIG. 1 be placed in a position where exterior sound and the like can be collected with high accuracy. Accordingly, the position of the speaker microphone 5 is not limited to the position shown in FIG. 1, and can be placed, for example at the front portion or the back portion of the digital camera 100.

Additionally, for example, when a sound such as a human conversation takes place in an area within, for example, a few-meter radius range with the digital camera 100 as the center (hereinafter, this area is referred to as a "short-distance area"), the sound is collected by the speaker microphone 5 as a relatively large sound, and consequently, a sound taking place outside the short-distance area (hereinafter, referred to as a "long-distance area") may not be collected by the speaker microphone 5. The sound taking place in the long-distance area, however, may reflect the image-capturing environment of the digital camera 100 more accurately.

Thus, for example, the following structure may be adapted. The digital camera 100 is modified to include one or more microphones with directivity, other than the speaker microphone 5, and the change amount calculation subunit 132 judges the imaging scene using, from among the sounds collected by the speaker microphone 5 and the one or more microphones, sounds whose change amount is less than a predetermined value.

(16) In the embodiments above, processing is performed in units of sound data having the unit duration (one second).

This one second, however, is just an example, and the unit duration may be longer or shorter.

Additionally, this unit for processing may be changed depending on each imaging scene to be judged or each sound category to be judged.

(17) The embodiments above have explained, as an example case, that the setting values are defined for each imaging scene. However, for example, the following structure may be adapted. The setting values are defined for each group of threshold values of the feature amounts, and when the feature amounts extracted from the target data are greater than or equal to the corresponding threshold values, the defined setting values are set to the control devices and the image processing unit. In this case it is not necessary to perform matching processing between the feature amounts extracted from the target data and the model information pieces. Note that the above-mentioned threshold values each may be a value with a range from the lowest value to the highest value.

(18) According to the embodiments, a discriminator which incorporates a machine learning method is used for the matching processing by the category judgment subunit 134. However, it is not limited to a machine learning method, and any method can be used as long as it can discriminate a defined classification category to which a signal with a particular feature amount belongs, according to a discriminating criterion. For example, as a pattern matching method, a method using vector correlation, an LPC (Linear Predictive Coding) method, a principal component analysis, a neutral network, a genetic algorithm, or Bayesian estimation may be adapted.

(19) In the embodiments, model information pieces each constituted from one set are used. However, for example, a set to be used may be switched. For example, the following structure may be adapted. The position of the digital camera is designated using the GPS (Global Positioning System), and a set including models according to languages used at the designated position or the like is used.

(20) According to the embodiments, each of the feature amounts extracted by the feature amount extraction subunit 131 is a vector quantity composed of, as components, two or more attributes among attributes of sound represented by the power of sound, zero crossing, spectrum-related feature amounts, cepstrum-related feature amounts, a chroma vector, etc. However, each of the feature amounts may be a vector quantity composed of one attribute.

(21) According to the second embodiment, the registration dates are registered in the category configuration table 70. However, the registration dates may not be registered in the category configuration table 70, and in addition, the date/time of generation of each image data (imaging date/time) may be acquired instead of the registration dates.

(22) The constituent elements described in the embodiments may be partially or entirely realized as an integrated circuit composed of one chip or a plurality of chips, as a computer program, or in any form.

(23) It is also possible to circulate/distribute a program for causing a processor to realize each processing described in the embodiments (see FIGS. 7, 8, 9, 11, 15, and 19), either by recording the program on a recording medium, or using various communication channels. The recording medium can be an IC card, an optical disc, a flexible disc, a ROM, a flash memory, or the like. The circulated/distributed program is made available for use by being stored in a memory or the like that can be read by a processor of an apparatus, and each processing described in the embodiments is realized by the processor executing the program.

(24) Each of the embodiments has described the digital camera as one embodiment of the imaging device pertaining to the present invention. However, it can be another device including an imaging mechanism, such as a mobile phone, a digital video camera, and a non-digital single-lens reflex camera.

It should be noted, however, that the image processing such as color correction by the image processing unit described in the embodiments is not performed by a non-digital single-lens reflex camera.

Additionally, although the structure of the main units of the digital camera has been described in the embodiments, the digital camera can obviously have other structural portions existing in ordinary digital cameras.

For example, the digital camera can be configured to include the following: a sensor that detects the status of the camera or change information; an I/O interface unit that performs I/O processing for data; a program memory that stores application programs; a file DB (database); an attribute information DB (database); a data memory that stores data generated in various processing; and a data bus for transferring control signals for controlling the constituent elements and data exchanged between various devices.

Although not particularly described in detail in the embodiments, the file DB and the attribute information DB are recorded on the recording medium described in the embodiments.

In the file DB, multiple file data pieces input from the data input unit are registered. The file data pieces include, for example, picture image data, moving image data, and music data.

In the attribute information DB, attribute information data of the data stored in the file DB is registered. The attribute information includes, for example, time information indicating the year/month/date of the capturing of the picture image data or the moving image data, and place information indicating the imaging place.

Note that the recording medium described above is not limited to a semiconductor memory, and can be realized by, for example, a high-capacity medium disc such as an HDD (Hard Disk Drive) or a DVD (Digital Versatile Disk). The program memory is realized by the storage devices such as the semiconductor memory, the HDD and the DVD. The application programs stored in the program memory include, in addition to programs for performing various processing described in the embodiments, programs for performing control processing on the entire digital camera, and the functions of the control unit that performs control on the entire digital camera are realized as the processor and the DSP described in the embodiments execute these programs.

(25) The modifications (1) to (24) can be partially or entirely combined and applied to the digital camera of the embodiments.

(26) The following further describes the structures of an imaging device pertaining to one aspect of the present invention, along with the modifications and effects thereof.

(a) The imaging device pertaining to one aspect of the present invention comprises: an imaging mechanism; a sound acquisition unit operable to acquire sound data that includes information reflecting an imaging environment; and a setting unit operable to, based on the sound data acquired by the sound acquisition unit, select and set one or more setting values for controlling the imaging mechanism.

The imaging device pertaining to the one aspect of the present invention with the above-described structure selects and sets setting values based on the sound data originating from the image-capturing environment. Accordingly, the imaging mechanism involving a shutter speed, sensitivity of the imaging element, etc. can be controlled appropriately for the environment where the imaging takes place.

(b) The imaging device may further comprise a scene designation unit that (i) includes an extraction subunit operable to extract, from the sound data acquired by the sound acquisition unit, an environmental sound feature amount indicating the imaging environment, (ii) stores therein model information pieces that each define various types of sound features, each of the types of sound features having a predetermined relationship with a corresponding one of imaging scenes, and (iii) is operable to designate one of the imaging scenes, with reference to the model information pieces and based on the environmental sound feature amount extracted by the extraction subunit. In this case the setting unit may (i) store therein correspondence information that associates each of the imaging scenes with one or more setting values, and (ii) select and set one or more setting values associated by the correspondence information with the imaging scene designated by the scene designation unit as the one or more setting values for controlling the imaging mechanism.

With the stated structure, the imaging device pertaining to the one aspect of the present invention is able to appropriately designate an imaging scene by performing matching processing between the environmental sound feature amount indicating the image-capturing environment and the model information pieces that are respectively associated with the imaging scenes. Accordingly, in cases where setting values are set in advance for each imaging scene, control appropriate for the imaging can be performed.

(c) The extraction subunit may determine, over each of predetermined units of time, a feature amount indicating features of the sound data, and when a temporal change in the feature amounts determined over the predetermined units of time is less than a predetermined amount, extract the feature amounts determined over the predetermined units of time as the environmental sound feature amount.

With the stated structure, the imaging device pertaining to the one aspect of the present invention excludes influence of accidentally occurring sound whose feature amounts show a temporal change greater than or equal to a predetermined amount, thereby allowing appropriate designation of the imaging scene.

(d) Each feature amount may be a vector quantity composed of, as components, two or more of attributes of sound that are represented by a power of sound, zero crossing, a spectrum-related feature amount, a cepstrum-related feature amount, and a chroma vector. In this case each model information piece may include information showing at least one value for each component of a vector quantity and is to be compared with each feature amount, and the scene designation unit may designate the imaging scene based on likelihoods that respectively pertain to pairs of a model information piece and a feature amount, each likelihood indicating a matching degree between the vector quantity indicated by the corresponding model information piece and the vector quantity of the corresponding feature amount.

With the stated structure, the imaging device pertaining to the one aspect of the present invention performs matching processing on a plurality of feature components related to sound, and accordingly, increases the possibility of designating the imaging scene appropriately, compared with a case where matching processing is performed on a single component.

(e) The information included in each model information piece may show an average value and a variance value as the at least one value for each component of the vector quantity.

In this case the scene designation unit may designate the imaging scene based on (i) likelihoods that respectively pertain to pairs of a model information piece and a feature amount, each likelihood indicating a matching degree between (a) the vector quantity that is indicated by the corresponding model information piece and that shows an average value and (b) the vector quantity of the corresponding feature amount, and (ii) variance values shown by the vector quantities indicated by the model information pieces.

According to the imaging device pertaining to the one aspect of the present invention with the stated structure, each model information piece indicates a plurality of sets of samples having a plurality of feature components related to sound, and because the imaging scene is designated based on the degree of variance of the component values of the samples, appropriate designation can be performed.

(f) The scene designation unit may designate the imaging scene based on, from among likelihoods that respectively pertain to pairs of a model information piece and a feature amount and that each indicate a matching degree between (i) the vector quantity of a corresponding one of the feature amounts which constitute the environmental sound feature amount and are determined over the predetermined units of time and (ii) the vector quantity indicated by the corresponding model information piece, one or more likelihoods excluding likelihoods that do not satisfy a criterion that, with regard to one of the model information pieces, each of the likelihoods is greater than a predetermined value for a predetermined number of consecutive units of time.

With the stated structure, the imaging device pertaining to the one aspect of the present invention excludes, from among the features related to sound originating from the environment, the features lasting only for an instant. As a result, in many cases, the imaging scene can be appropriately designated.

(g) The imaging device may further comprise a correction unit that (i) stores therein information for associating each model information piece with processing for correcting the one or more setting values for controlling the imaging mechanism, (ii) designates one or more of the model information pieces each of whose likelihoods is greater than a predetermined value, and (iii) executes the processing associated with the designated one or more of the model information pieces.

With the stated structure, the imaging device pertaining to the one aspect of the present invention is able to control the imaging mechanism more appropriately by correcting the setting values in relation to specific features indicated by the model information pieces.

(h) Each model information piece may belong to one of a plurality of groups. In this case the scene designation unit may (i) store therein each model information piece and a coefficient in association with each other, (ii) for each group, calculate a group likelihood based on the likelihood and the coefficient associated with each model information piece belonging to the group, and (iii) designate the imaging scene based on the group likelihoods.

With the stated structure, the imaging device pertaining to the one aspect of the present invention is able to control the imaging mechanism more appropriately, under the precondition that the coefficients are appropriately set in advance.

(i) The imaging device may further comprise an operation reception unit operable to receive an operation by a user. In this case the scene designation unit may (i) refer to each model information piece, (ii) select two or more of the imaging scenes as candidates based on the environmental sound feature amount extracted by the extraction subunit, and (iii) designate one of the candidates as the imaging scene based on the selected candidates and the operation by the user received by the operation reception unit.

With the stated structure, the imaging device pertaining to the one aspect of the present invention can narrow down the imaging scenes as candidates. Accordingly, the user is able to select an imaging scene with a simple operation.

(j) The imaging mechanism may include an image data generation unit operable to generate image data by imaging. In this case the setting unit may select and set one or more setting values that are to be used for controlling the imaging mechanism after the imaging has been conducted for the image data, based on the sound data and the image data.

With the stated structure, the imaging device pertaining to the one aspect of the present invention selects and sets the setting values based not only on the sound but also on the image, and accordingly, is able to perform control more appropriate for the environment where the imaging takes place.

(27) The imaging mechanism of the present invention corresponds to an imaging mechanism known to be included in ordinary imaging devices such as digital cameras, and may include the following by way of example: the imaging lens 1, the image data generation unit 140 including an imaging element such as CCD or CMOS, a device for controlling driving of the imaging lens 1, a shutter, a control device for controlling driving of the shutter, a device for controlling the sensitivity of the imaging element, and an image processing unit that performs processing on the captured image data.

The sound acquisition unit of the present invention corresponds to the sound acquisition unit 110 of the embodiments. The setting unit of the present invention corresponds to the setting unit 120 of the embodiments. The scene designation unit of the present invention corresponds to the scene designation units of the embodiments. The correction unit of the present invention corresponds to the sound designation unit 220 and the image processing unit 230 of the embodiments. The operation reception unit of the present invention corresponds to the operation panel 8. The image data generation unit of the present invention corresponds to the image data generation unit 140 of the embodiments.

INDUSTRIAL APPLICABILITY

The present invention can be utilized for controlling an imaging mechanism of an imaging device such as a DSC.

REFERENCE SIGNS LIST

1 imaging lens
2 strobe light emitter
3 sensor
4 release button
5 speaker microphone
6 display
7 dial button
8 operation panel
100, 200, 300 digital camera
110 sound acquisition unit
120 setting unit
130, 210, 310 scene designation unit
131 feature amount extraction subunit
132 change amount calculation subunit
133 reference storage subunit
134 category judgment subunit
135 reliability calculation subunit
136, 211, 311 status judgment (sub)unit
137 imaging scene judgment subunit
140 image data generation unit
141, 230 image processing unit
220 sound designation unit
320 classification information storage unit
330 classification information generation unit

The invention claimed is:

1. An imaging device comprising:
an imaging mechanism;
a sound acquisition unit operable to acquire sound data that includes information reflecting an imaging environment;
a setting unit operable to, based on the sound data acquired by the sound acquisition unit, select and set one or more setting values for controlling the imaging mechanism; and
a scene designation unit that (i) includes an extraction subunit operable to extract, from the sound data acquired by the sound acquisition unit, an environmental sound feature amount indicating the imaging environment, (ii) stores therein model information pieces that each defines various types of sound features, each of the types of sound features having a predetermined relationship with a corresponding one of imaging scenes, and (iii) is operable to designate one of the imaging scenes, with reference to the model information pieces and based on the environmental sound feature amount extracted by the extraction subunit, wherein
each feature amount is a vector quantity composed of, as components, one or more of attributes of sound that are represented by a power of sound, zero crossing, a spectrum-related feature amount, a cepstrum-related feature amount, and a chroma vector,
each model information piece includes information showing at least one value for each component of a vector quantity and is to be compared with each feature amount,
the scene designation unit designates the imaging scene based on likelihoods that respectively pertain to pairs of a model information piece and a feature amount, each likelihood indicating a matching degree between the vector quantity indicated by the corresponding model information piece and the vector quantity of the corresponding feature amount, and
the setting unit (i) stores therein correspondence information that associates each of the imaging scenes with one or more setting values, and (ii) selects and sets one or more setting values associated by the correspondence information with the imaging scene designated by the scene designation unit as the one or more setting values for controlling the imaging mechanism.

2. The imaging device of claim 1, wherein
the extraction subunit determines, over each of predetermined units of time, a feature amount indicating features of the sound data, and when a temporal change in the feature amounts determined over the predetermined units of time is less than a predetermined amount, extracts the feature amounts determined over the predetermined units of time as the environmental sound feature amount.

3. The imaging device of claim 2, wherein
each feature amount is a vector quantity composed of, as components, two or more of attributes of sound that are represented by a power of sound, zero crossing, a spectrum-related feature amount, a cepstrum-related feature amount, and a chroma vector, each model information piece includes information showing at least one value for each component of a vector quantity and is to be compared with each feature amount, and the scene designation unit designates the imaging scene based on likelihoods that respectively pertain to pairs of a model information piece and a feature amount, each likelihood indicating a matching degree between the vector quantity indicated by the corresponding model information piece and the vector quantity of the corresponding feature amount.

4. The imaging device of claim 3, wherein
the information included in each model information piece shows an average value and a variance value as the at least one value for each component of the vector quantity, and the scene designation unit designates the imaging scene based on (i) likelihoods that respectively pertain to pairs of a model information piece and a feature amount, each likelihood indicating a matching degree between (a) the vector quantity that is indicated by the corresponding model information piece and that shows an average value and (b) the vector quantity of the corresponding feature amount, and (ii) variance values shown by the vector quantities indicated by the model information pieces.

5. The imaging device of claim 3, wherein
the scene designation unit designates the imaging scene based on, from among likelihoods that respectively pertain to pairs of a model information piece and a feature amount and that each indicate a matching degree between (i) the vector quantity of a corresponding one of the feature amounts which constitute the environmental sound feature amount and are determined over the predetermined units of time and (ii) the vector quantity indicated by the corresponding model information piece, one or more likelihoods excluding likelihoods that do not satisfy a criterion that, with regard to one of the model information pieces, each of the likelihoods is greater than a predetermined value for a predetermined number of consecutive units of time.

6. The imaging device of claim 3, further comprising
a correction unit that (i) stores therein information for associating each model information piece with processing for correcting the one or more setting values for controlling the imaging mechanism, (ii) designates one or more of the model information pieces each of whose likelihoods is greater than a predetermined value, and (iii) executes the processing associated with the designated one or more of the model information pieces.

7. The imaging device of claim 3, wherein
each model information piece belongs to one of a plurality of groups, and the scene designation unit (i) stores therein each model information piece and a coefficient in association with each other, (ii) for each group, calculates a group likelihood based on the likelihood and the coefficient associated with each model information piece belonging to the group, and (iii) designates the imaging scene based on the group likelihoods.

8. The imaging device of claim 1, further comprising
an operation reception unit operable to receive an operation by a user, wherein the scene designation unit (i) refers to each model information piece, (ii) selects two or more of the imaging scenes as candidates based on the environmental sound feature amount extracted by the extraction subunit, and (iii) designates one of the candidates as the imaging scene based on the selected candidates and the operation by the user received by the operation reception unit.

9. The imaging device of claim 1, wherein
the imaging mechanism includes an image data generation unit operable to generate image data by imaging, and the setting unit selects and sets one or more setting values that are to be used for controlling the imaging mechanism after the imaging has been conducted for the image data, based on the sound data and the image data.

10. An integrated circuit comprising:
a sound acquisition circuit operable to acquire sound data that includes information reflecting an imaging environment;

a setting circuit operable to, based on the sound data acquired by the sound acquisition circuit, select and set one or more setting values for controlling image capturing; and a scene designation circuit that (i) includes an extraction sub-circuit operable to extract, from the sound data acquired by the sound acquisition circuit, an environmental sound feature amount indicating the imaging environment, (ii) stores model information pieces that each defines various types of sound features, each of the types of sound features having a predetermined relationship with a corresponding one of imaging scenes, and (iii) is operable to designate one of the imaging scenes, with reference to the model information pieces and based on the environmental sound feature amount extracted by the extraction sub-circuit, wherein each feature amount is a vector quantity composed of, as components, one or more of attributes of sound that are represented by a power of sound, zero crossing, a spectrum-related feature amount, a cepstrum-related feature amount, and a chroma vector, each model information piece includes information showing at least one value for each component of a vector quantity and is to be compared with each feature amount, the scene designation circuit designates the imaging scene based on likelihoods that respectively pertain to pairs of a model information piece and a feature amount, each likelihood indicating a matching degree between the vector quantity indicated by the corresponding model information piece and the vector quantity of the corresponding feature amount, and the setting circuit (i) stores correspondence information that associates each of the imaging scenes with one or more setting values, and (ii) selects and sets one or more setting values associated by the correspondence information with the imaging scene designated by the scene designation circuit as the one or more setting values for controlling the image capturing.

11. An imaging method used by an imaging device that includes an imaging mechanism, the imaging method comprising:
a sound acquisition step of acquiring sound data that includes information reflecting an imaging environment;

a setting step of, based on the sound data acquired in the sound acquisition step, selecting and setting one or more setting values for controlling the imaging mechanism; and a scene designation step that includes an extraction sub-step of extracting, from the sound data acquired in the sound acquisition step, an environmental sound feature amount indicating the imaging environment, the scene designation step also being a step of (i) storing model information pieces that each defines various types of sound features, each of the types of sound features having a predetermined relationship with a corresponding one of imaging scenes, and (iii) designating one of the imaging scenes, with reference to the model information pieces and based on the environmental sound feature amount extracted in the extraction sub-step, wherein each feature amount is a vector quantity composed of, as components, one or more of attributes of sound that are represented by a power of sound, zero crossing, a spectrum-related feature amount, a cepstrum-related feature amount, and a chroma vector, each model information piece includes information showing at least one value for each component of a vector quantity and is to be compared with each feature amount, the scene designation step designates the imaging scene based on likelihoods that respectively pertain to pairs of a model information piece and a feature amount, each likelihood indicating a matching degree between the vector quantity indicated by the corresponding model information piece and the vector quantity of the corresponding feature amount, and the setting step (i) stores correspondence information that associates each of the imaging scenes with one or more setting values, and (ii) selects and sets one or more setting values associated by the correspondence information with the imaging scene designated in the scene designation step as the one or more setting values for controlling the imaging mechanism.

12. A non-transitory recording medium having recorded thereon a program that causes a computer of an imaging device including an imaging mechanism to perform imaging processing, the imaging processing comprising:

a sound acquisition step of acquiring sound data that includes information reflecting an imaging environment;

a setting step of, based on the sound data acquired in the sound acquisition step, selecting and setting one or more setting values for controlling the imaging mechanism; and a scene designation step that includes an extraction sub-step of extracting, from the sound data acquired in the sound acquisition step, an environmental sound feature amount indicating the imaging environment, the scene designation step also being a step of (i) storing model information pieces that each defines various types of sound features, each of the types of sound features having a predetermined relationship with a corresponding one of imaging scenes, and (iii) designating one of the imaging scenes, with reference to the model information pieces and based on the environmental sound feature amount extracted in the extraction sub-step, wherein each feature amount is a vector quantity composed of, as components, one or more of attributes of sound that are represented by a power of sound, zero crossing, a spectrum-related feature amount, a cepstrum-related feature amount, and a chroma vector, each model information piece includes information showing at least one value for each component of a vector quantity and is to be compared with each feature amount, the scene designation step designates the imaging scene based on likelihoods that respectively pertain to pairs of a model information piece and a feature amount, each likelihood indicating a matching degree between the vector quantity indicated by the corresponding model information piece and the vector quantity of the corresponding feature amount, and the setting step (i) stores correspondence information that associates each of the imaging scenes with one or more setting values, and (ii) selects and sets one or more setting values associated by the correspondence information with the imaging scene designated in the scene designation step as the one or more setting values for controlling the imaging mechanism.

* * * * *